United States Patent
Summers

(10) Patent No.: US 10,055,364 B2
(45) Date of Patent: Aug. 21, 2018

(54) METHODS AND SYSTEMS FOR FILTERING COMMUNICATION BETWEEN PERIPHERAL DEVICES AND MOBILE COMPUTING DEVICES

(71) Applicant: Citrix Systems, Inc., Fort Lauderdale, FL (US)

(72) Inventor: Jacob Summers, Coral Springs, FL (US)

(73) Assignee: Citrix Systems, Inc., Fort Lauderdale, FL (US)

( * ) Notice: Subject to any disclaimer, the term of this patent is extended or adjusted under 35 U.S.C. 154(b) by 0 days.

(21) Appl. No.: 15/689,581

(22) Filed: Aug. 29, 2017

(65) Prior Publication Data

US 2017/0357602 A1    Dec. 14, 2017

Related U.S. Application Data

(63) Continuation of application No. 14/506,516, filed on Oct. 3, 2014, now Pat. No. 9,767,047.

(51) Int. Cl.
*G06F 13/10* (2006.01)
*G06F 13/38* (2006.01)
(Continued)

(52) U.S. Cl.
CPC .......... *G06F 13/102* (2013.01); *G06F 13/385* (2013.01); *H04W 4/80* (2018.02);
(Continued)

(58) Field of Classification Search
CPC ...... G06F 13/102; G06F 13/385; H04W 4/80; H04W 52/0251; H04W 52/0277;
(Continued)

(56) References Cited

U.S. PATENT DOCUMENTS

2005/0209842 A1    9/2005   Klein
2007/0250649 A1   10/2007   Hickey et al.
(Continued)

FOREIGN PATENT DOCUMENTS

EP    2 075 991 A1    1/2009

OTHER PUBLICATIONS

International Search Report and Written Opinion for PCT Appl. No. PCT/US2014/067481, dated Jul. 14, 2015.
(Continued)

*Primary Examiner* — Idriss N Alrobaye
*Assistant Examiner* — Ronald T Modo
(74) *Attorney, Agent, or Firm* — Foley & Lardner LLP; Christopher J. McKenna

(57) ABSTRACT

The embodiments are directed to methods and systems for sending and receiving signals between one or more peripheral devices connected to a dongle system and an operating system. The methods and systems can detect when a dongle system has been connected to a mobile computing device. The methods and systems can receive an input to use the dongle system with a local operating system or a remote operating system. The methods and systems can also establish a communication channel between the local operating system and the remote operating system, and exchange signals between the dongle system and the remote operating system using one or more virtual filters.

20 Claims, 16 Drawing Sheets

(51) Int. Cl.
*H04W 52/02* (2009.01)
*H04W 4/80* (2018.01)
(52) U.S. Cl.
CPC ..... *H04W 52/027* (2013.01); *H04W 52/0251* (2013.01); *H04W 52/0277* (2013.01); *Y02D 70/00* (2018.01); *Y02D 70/142* (2018.01); *Y02D 70/144* (2018.01); *Y02D 70/162* (2018.01); *Y02D 70/23* (2018.01)
(58) Field of Classification Search
CPC ... H04W 52/027; Y02D 70/162; Y02D 70/23; Y02D 70/144; Y02D 70/142; Y02D 70/00
See application file for complete search history.

(56) References Cited

U.S. PATENT DOCUMENTS

| | | |
|---|---|---|
| 2008/0159376 A1 | 7/2008 | Yamaguchi |
| 2009/0043921 A1 | 2/2009 | Roy |
| 2013/0346531 A1 | 12/2013 | Hummel et al. |
| 2014/0012892 A1 | 1/2014 | Jaudon et al. |
| 2014/0019653 A1 | 1/2014 | Amchislavsky et al. |
| 2014/0173355 A1 | 6/2014 | Aasheim et al. |
| 2015/0019765 A1* | 1/2015 | Kegel .................. G06F 13/24 710/48 |
| 2015/0180432 A1 | 6/2015 | Gao et al. |
| 2016/0003621 A1 | 1/2016 | Koenig et al. |

OTHER PUBLICATIONS

Stanek, W., "Windows Server 2012 R2 Inside Out: Services, Security & Infrastructure—Supporting Remote Desktop Connection Clients", Microsoft Press, May 7, 2014, 4 pages.

U.S. Office Action for U.S. Appl. No. 14/506,516, dated Sep. 9, 2016.

* cited by examiner

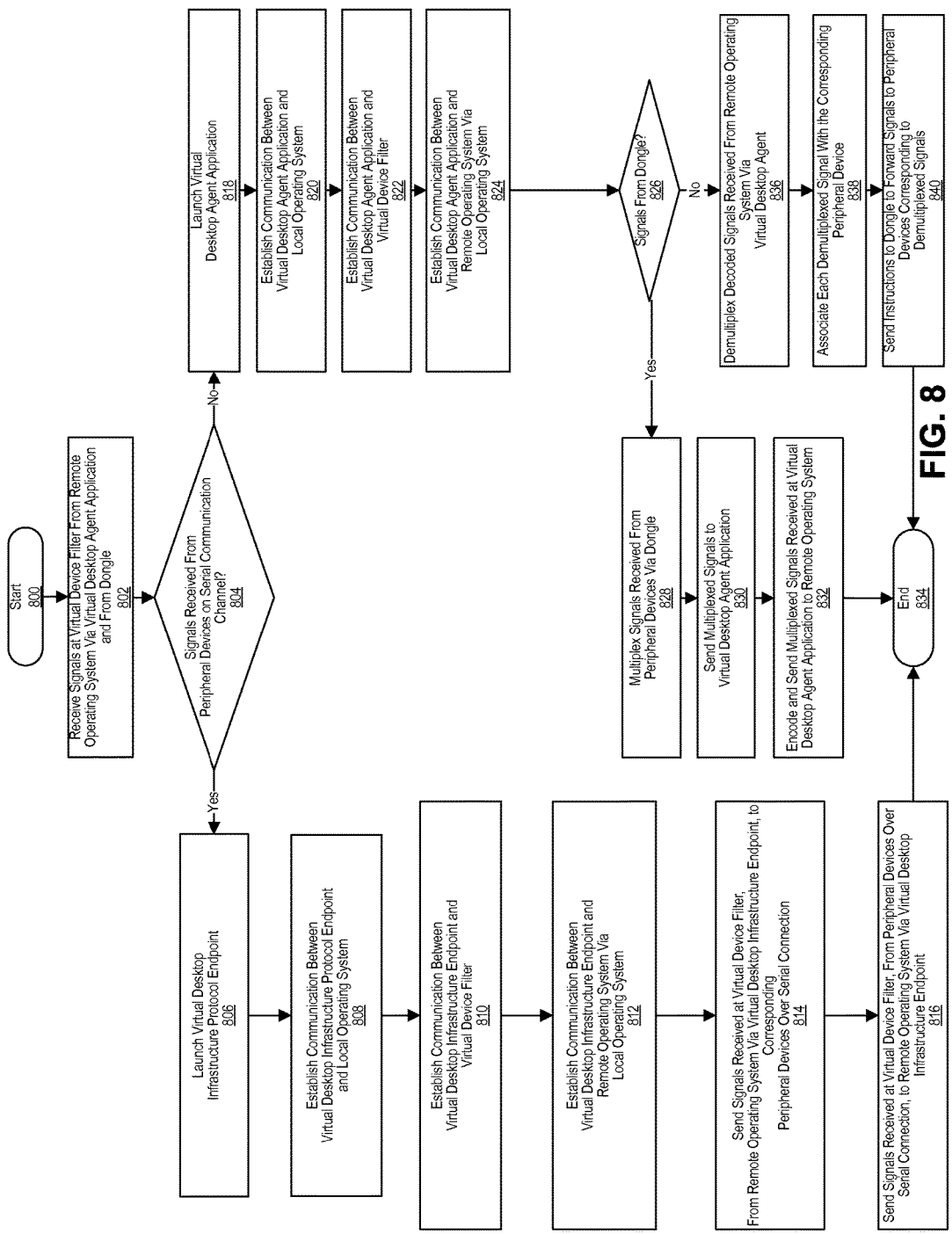

METHODS AND SYSTEMS FOR FILTERING COMMUNICATION BETWEEN PERIPHERAL DEVICES AND MOBILE COMPUTING DEVICES

RELATED APPLICATIONS

This patent application is a continuation of, and claims priority to and the benefit of U.S. patent application Ser. No. 14/506,516, entitled "METHODS AND SYSTEMS FOR FILTERING COMMUNICATION BETWEEN PERIPHERAL DEVICES AND MOBILE COMPUTING DEVICES," and filed Oct. 3, 2014, the contents of all of which are hereby incorporated herein by reference in their entirety for all purposes.

BACKGROUND

Peripheral devices were originally created to enable a user (i.e., human being) to interact with a computing device (e.g., desktop and laptop computers), and vice versa. Peripheral devices were designed to receive instructions from a user, in the form of an input, and to send the input to a computing device, which then translates the input into a meaningful format that can be used by one or more software or hardware components to produce an output. For example, a user might enter a series of keystrokes on a keyboard that is connected to the computing device, and a monitor connected to the computing device might display letters corresponding to the keystrokes entered by the user. The user interacts with the computing device by entering keystrokes on the keyboard and the computing device interacts with the user by displaying letters that correspond to the keystrokes. In order to accomplish this, computing devices use a combination of hardware and software to send and receive instructions to peripheral devices. Some of the hardware used to send and receive instructions includes storage devices (e.g., hard disks), processors, ports (e.g., Universal Serial Bus port), buses (e.g., Peripheral Component Interconnect bus), and controllers (e.g., keyboard controller). Some of the software includes one or more peripheral device drivers (e.g., software used to send and receive instructions between the computing device and peripheral device), and an operating system.

Operating systems communicate with peripheral devices by sending instructions to a device driver that translates the instructions into a format recognizable by a device controller that controls the peripheral devices. The device controller controls the peripheral devices by sending and receiving control signals through ports and/or buses connecting the device controller to the peripheral devices. The operating system determines how the instructions are translated. For example, the output produced by a keyboard when a user is using a Windows operating system may be different from the output produced by a keyboard when a user is using a Linux operating system because the operating systems interpret the keystrokes differently. Similarly, an operating system installed on a mobile computing device (e.g., mobile phones, tablets, and Personal Data Assistants (PDAs)) may not interpret instructions from a device driver the same way an operating system on a non-mobile computing device would interpret the same instructions. For instance, an operating system (e.g., Android mobile OS) installed on a mobile computing device may interpret an input from a keyboard differently from an operating system (e.g., Windows XP) installed on a non-mobile computing device. As a result, a user may not be able to execute the same operations on both operating systems when using the same peripheral device. Therefore, a user is either forced to use a non-mobile computing device for some tasks and a mobile computing device for other tasks, or use different peripheral devices (e.g, printers) that are designed specifically for certain mobile operating systems.

An alternative solution involves creating custom software and hardware solutions that enable a mobile operating system to work with any peripheral device. One approach requires a user to modify (e.g., hack) the mobile operating system running on a mobile computing device to incorporate features from a non-mobile operating system that can interface with a peripheral device. This approach can only be used, however, with open source operating systems (e.g., Android OS). Therefore, mobile computing device manufactures that use non-open operating systems may not provide a user with access to the mobile operating system in order to modify the mobile operating system.

In addition to modifying the software, a user can also create a custom hardware design solution that enables communication between a mobile operating system and software running on a peripheral device. One approach is to create custom peripheral devices that communicate with the mobile operating system using USB On The Go (USB OTG). These solutions, however, often require proprietary and non-standard protocols, thereby limiting their usefulness to particular applications and peripheral pairs.

Furthermore, after communication has been established between the mobile operating system and software running on the peripheral device, a user will have to search for device drivers installed in the mobile operating system that have to be modified to work with the peripheral device. Otherwise, a user will be tasked with developing device drivers that can enable the mobile operating system to work with the peripheral device. In either case, a user may have to spend a considerable amount of time debugging the code they developed to hack the mobile operating system. This could result in the peripheral device or the mobile device malfunctioning. Another problem with this approach is that a user would be required to perform the same procedure for each peripheral device that is not natively supported by their mobile computing device's operating system. Additionally, if a user has more than one mobile computing device, and wants to use one or more peripherals with their other mobile computing devices, the user may have to repeat the same procedure twice for each mobile computing device.

Furthermore, if a user's mobile computing devices are not exactly the same, even if the mobile operating systems are the same, the user may not be able to perform the same procedure when attempting to pair the same peripheral device to different mobile computing devices. For instance, a user might use an Apple™ mobile phone and a HTC™ mobile phone, and may want to use the same keyboard with each mobile phone. The hardware and software needed to make the peripheral device work with both mobile computing devices, however, might not be the same. Thus, a user may be forced to purchase a second keyboard if they are unable to develop the necessary hardware and software solutions to pair the keyboard with the mobile operating system associated with the mobile computing device. This is not a feasible solution for mobile computing device users.

Another issue with the current solution(s) to this problem is that they do not support the interaction between peripheral devices and desktop virtualization technology. For instance, a user accessing a virtual desktop (e.g., Windows operating system) hosted on a server by using an application installed on top of a mobile operating system running on a mobile computing device may encounter issues inputting commands as some of the commands entered by the user do not translate into commands that are normally recognized by the operating system. For example, a user may enter a cut or paste command using a keyboard, and the mobile operating system installed on the user's mobile computing device may not recognize the command, or may instruct the mobile computing device to perform another operation. Because keystrokes can be intercepted by a mobile operating system instead of an operating system running on a virtual desktop, a user may not be able to perform the same operations on a mobile computing device, using the same commands on a mobile computing device that they would on a non-mobile computing device (e.g., laptop or desktop computer). Therefore, the current solutions do not provide users with the ability to use peripheral devices the same way that they would on a non-mobile computing device or the same way that they would use a peripheral device on a mobile computing device connected to a server hosting a virtual desktop.

BRIEF DESCRIPTION OF THE DRAWINGS

FIG. 8. is a flowchart representing exemplary methods for filtering signals exchanged between a dongle system and a remote desktop client.

DETAILED DESCRIPTION

Reference will now be made in detail to the exemplary embodiments implemented according to the present disclosure, the examples of which are illustrated in the accompanying drawings. Wherever possible, the same reference numbers will be used throughout the drawings to refer to the same or like parts.

The embodiments described in the current disclosure provide the ability to fully utilize peripheral devices by presenting hardware and software solutions that enable mobile computing device operating systems to interact with software running on the peripheral devices.

Figure 1:
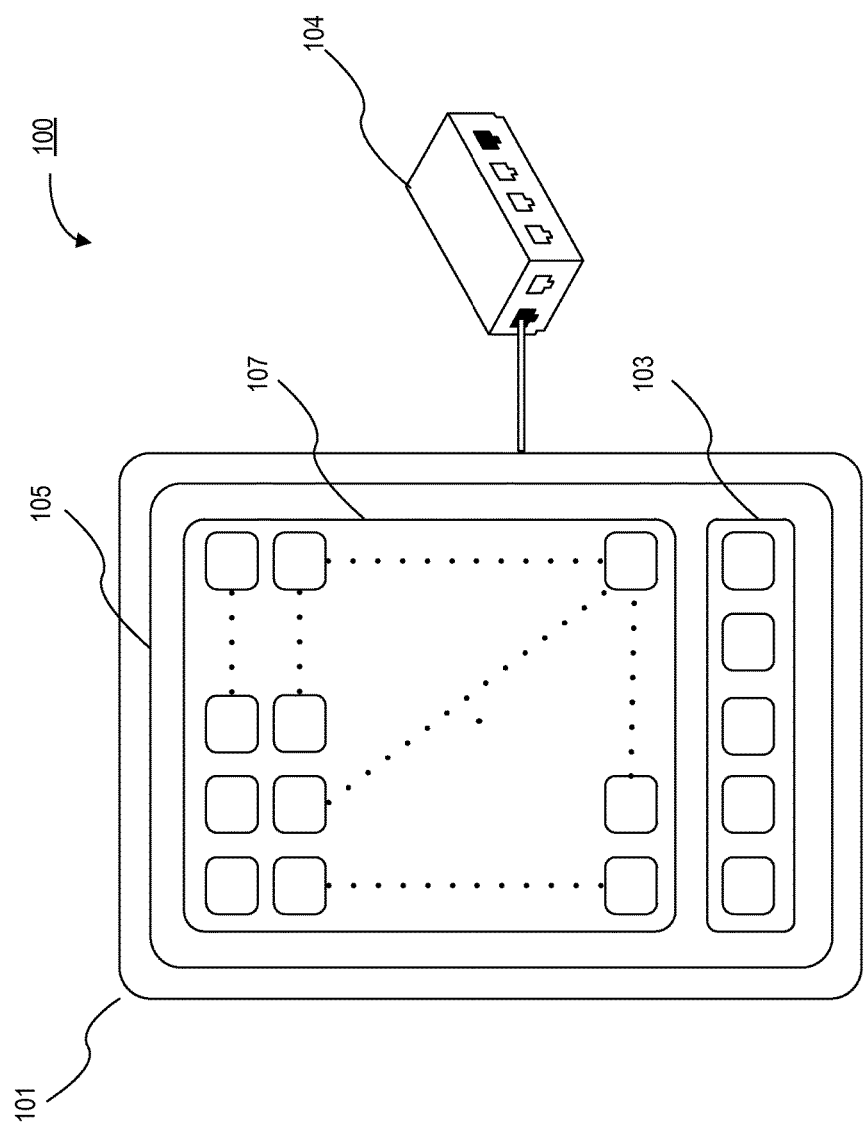
FIG. 1 is an exemplary mobile computing device display, consistent with embodiments of the present disclosure.

FIG. 1 is an exemplary mobile computing device display, consistent with embodiments of the present disclosure. On one planar side of mobile computing device 101 is display 105 that can be realized as a touch-sensitive display in some embodiments. In other embodiments display 105 may not be a touch sensitive display. Display 105 can be constructed using a touch-sensitive input surface coupled to an electronic controller. The touch-sensitive input surface may overlay a visible element (e.g., screen) of display 105. The combination of the touch-sensitive input surface overlaid on top of the visible element may form a touch-sensitive overlay. The touch-sensitive overlay can be used to output (e.g., display) information to a user via the visible element (e.g., screen), and to receive input from a user via the touch-sensitive element.

Display 105 may display icons 107 and 103 that can represent applications installed on mobile computing device 101. In some embodiments, icons 103 may represent applications that are pre-installed on mobile computing device 101. These applications may be a part of a mobile operating system installed on mobile computing device 101. Icons 107 may represent third-party applications installed on mobile computing device 101 by a user. Mobile computing device 101 can be connected to a dongle system 104.

Figure 2:
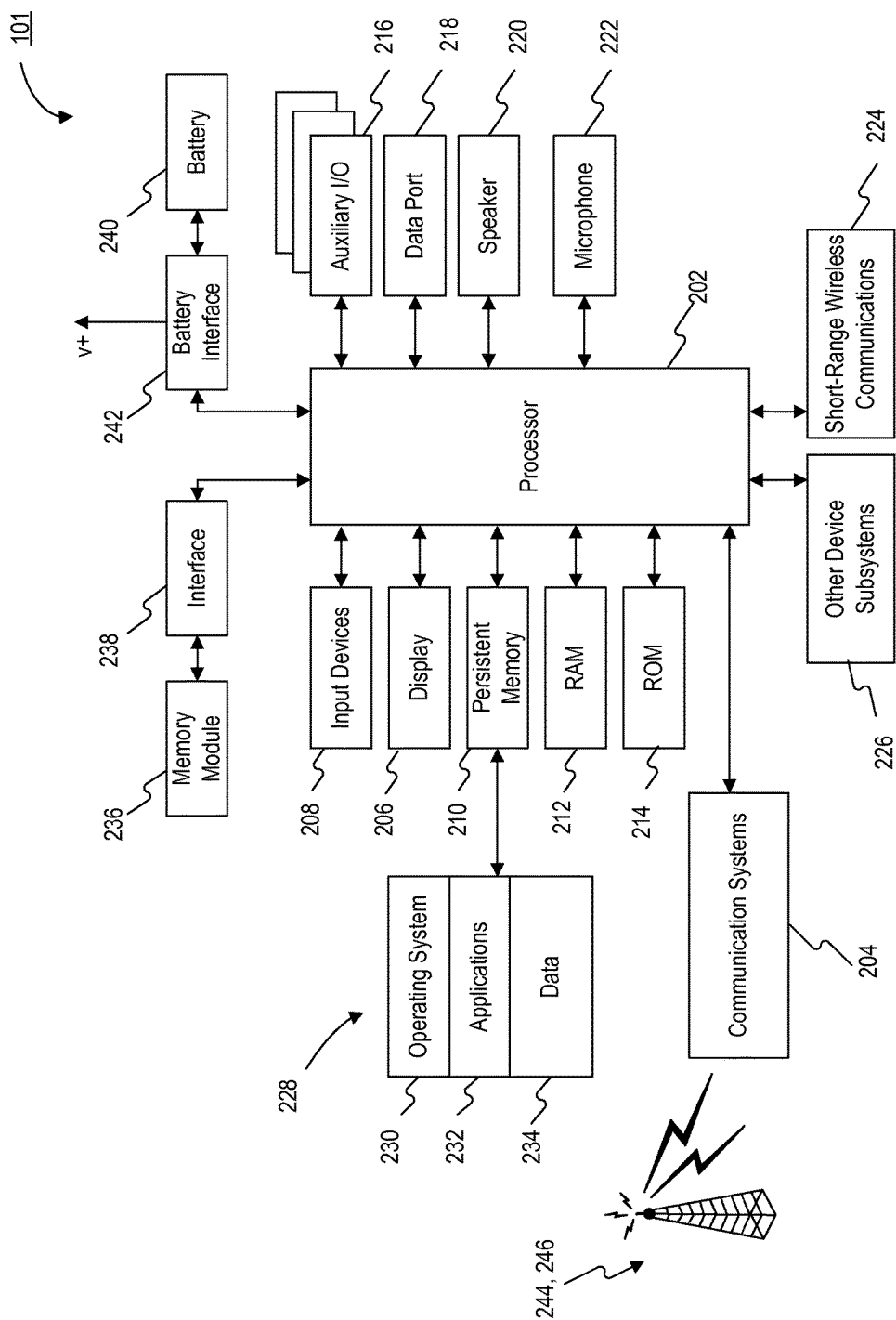
FIG. 2 is a block diagram of an exemplary mobile computing device, consistent with embodiments of the present disclosure.

FIG. 2 is a block diagram of the exemplary mobile computing device 101, consistent with embodiments of the present disclosure. Mobile computing device 101 is a two-way communication device having data and voice communication capabilities, and the capability to communicate with other computer systems, for example, via the Internet. Depending on the functionality provided by mobile computing device 101, in various embodiments mobile computing device 101 can be a handheld device, a multiple-mode communication device configured for both data and voice communication, a smartphone a mobile telephone, a netbook, a gaming console, a tablet, or a PDA (Personal Data Assistant) enabled for wired or wireless communication.

Mobile computing device 101 includes a case (not shown) housing the component of mobile computing device 101. In some embodiments, mobile computing device 101 has a rectangular shape with two planar sides, although other configurations may be adopted. The internal components of mobile computing device 101 can, for example, be constructed on a printed circuit board (PCB). The description of mobile computing device 101 herein mentions a number of specific components and subsystems. Although these components and subsystems can be realized as discrete elements, the functions of the components and subsystems can also be realized by integrating, combining, or packaging one or more elements in any suitable fashion.

Mobile computing device 101 includes a controller comprising at least one processor 202 (such as a microprocessor), which controls the operation of mobile computing device 101. Processor 202 can be a single microprocessor, multiple microprocessors, field programmable gate arrays (FPGAs), digital signal processors (DSPs) capable of executing particular sets of instructions, or any circuit capable of electrically coupling the device subsystems.

Processor 202 interacts with device subsystems such as a communication system 204 for exchanging radio frequency signals with a wireless network (for example WAN 244 and/or PLMN 246) to perform communication functions.

Processor 202 also interacts with additional device subsystems including a display 206 such as a liquid crystal display (LCD) screen or any other appropriate display, input devices 208 such as a keyboard and control buttons, persistent memory 210, random access memory (RAM) 212, read only memory (ROM) 214, auxiliary input/output (I/O) subsystems 216, data port 218 such as a conventional serial data port or a Universal Serial Bus (USB) data port, speaker 220, microphone 222, short-range wireless communication subsystem 224 (which can employ any appropriate wireless (for example, RF), optical, or other short range communications technology), and other device subsystems generally designated as 226. Some of the subsystems shown in FIG. 2 perform communication-related functions, whereas other subsystems can provide "resident" or on-device functions.

Processor 202 operates under stored program control and executes software modules 228 stored in a tangible non-transitory computer-readable storage medium such as persistent memory 210, which can be a flexible disk, a hard disk, a CD-ROM (Compact Disk—Read Only Memory), a MO (Magneto-Optical) disk, a DVD-ROM (Digital Versatile Disk—Read only Memory), a DVD-RAM (Digital Versatile Disk—Random Access Memory), or a semiconductor memory. Software modules 228 can also be stored in a computer-readable storage medium such as ROM 214, or any appropriate persistent memory technology, including EEPROM, EAROM, and FLASH. These computer readable storage mediums store computer-readable instructions for execution by processor 202 to perform a variety of functions on mobile computing device 101.

Software modules 228 can include mobile operating system software 230, used to control operation of mobile computing device 101. Additionally, software modules 228 can include software applications 232 for providing additional functionality to mobile computing device 101. Software applications 232 can further include a range of applications, including, for example, virtual desktop application, e-mail messaging application, address book, spell check application, text prediction application, notepad application, Internet browser application, voice communication (e.g., telephony) application, mapping application, or a media player application, or any combination thereof. Each of software applications 232 can include layout information defining the placement or particular fields and graphic elements (for example, text fields, input fields, icons, etc.) in the user interface (e.g., display 206) according to the application.

In some embodiments, auxiliary input/output (I/O) subsystems 216 comprise an external communication link or interface, for example, an Ethernet connection. In some embodiments, auxiliary I/O subsystems 216 further comprise one or more input devices, including a pointing or navigational tool such as an optical trackpad, clickable trackball, scroll wheel or thumbwheel, or one or more output devices, including a mechanical transducer such as a vibrator for providing vibratory notifications in response to various events on mobile computing device 101 (for example, receipt of an electronic message or incoming phone call), or for other purposes such as haptic feedback (touch feedback).

In some embodiments, mobile computing device 101 also includes one or more removable memory modules 236 (typically comprising FLASH memory) and a memory module interface 238. Among possible functions of removable memory module 236 is to store information used to identify or authenticate a subscriber or the subscriber's account to a wireless network (for example WAN 244 or PLMN 246). For example, in conjunction with certain types of wireless networks, such as GSM and successor networks, removable memory module 236 is referred to as a Subscriber Identity Module (SIM). Memory module 236 is inserted in or coupled to memory module interface 238 of mobile computing device 101 in order to operate in conjunction with the wireless network.

Mobile computing device 101 also includes a battery 240 which furnishes energy for operating mobile computing device 101. Battery 240 can be coupled to the electrical circuitry of mobile computing device 101 through a battery interface 242, which can manage such functions as charging battery 240 from an external power source (not shown) and the distribution of energy to various loads within or coupled to mobile computing device 101. Short-range wireless communications subsystem 224 is an additional optional component that provides for communication between mobile computing device 101 and different systems or devices, which need not necessarily be similar devices. For example, short-range wireless communications subsystem 224 can include an infrared device and associated circuits and components, or a wireless bus protocol compliant communication device such as a BLUETOOTH® communication module to provide for communication with similarly-enabled systems and devices.

A predetermined set of applications that control basic device operations, including data and possibly voice communication applications can be installed on mobile computing device 101 during or after manufacture. Additional applications or upgrades to operating system software 130 or software applications 232 can also be loaded onto mobile computing device 101 through the wireless network (for example WAN 244 and/or PLMN 246), auxiliary I/O subsystem 216, data port 218, short-range wireless communication subsystem 224, or other suitable subsystems 226. The downloaded programs or code modules can be permanently installed, for example, written into the persistent memory 210, or written into and executed from RAM 212 for execution by processor 202 at runtime.

Figures 3A, 3B:
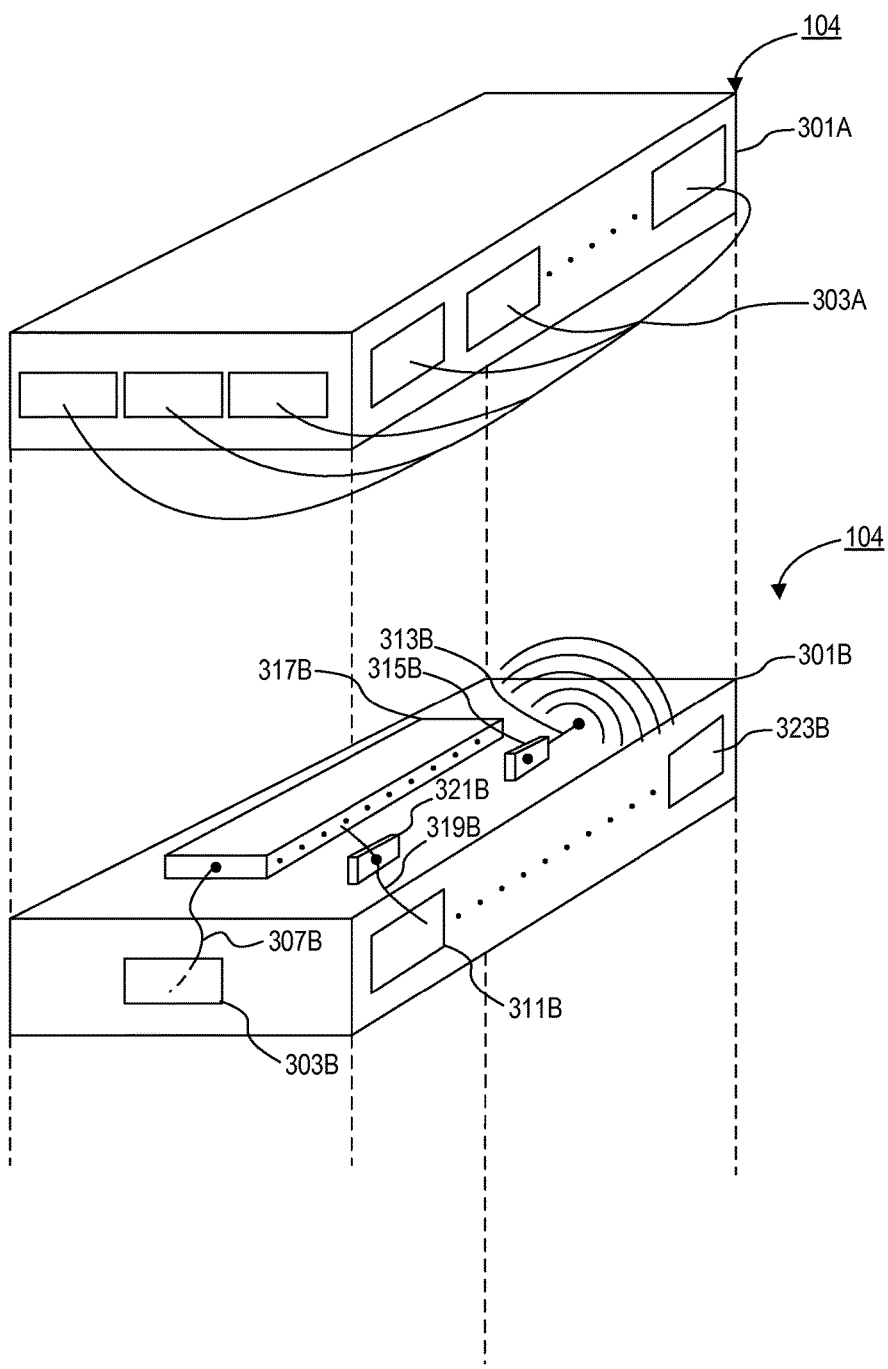
FIG. 3A is a diagram of an exemplary dongle system, consistent with embodiments of the present disclosure.
FIG. 3B is a diagram of an exemplary dongle system, consistent with embodiments of the present disclosure.

FIG. 3A is a diagram of an exemplary dongle system, consistent with embodiments of the present disclosure. Dongle system 104 can comprise enclosure 301A and data ports 303A. Enclosure 301A can be a housing enclosing one or more electronics that can enable one or more peripheral devices (not shown) and one or more mobile computing devices (not shown) to communicate. Enclosure 303A can be made of plastic, wood, rubber or a combination of any of the aforementioned nonconductive materials. In some embodiments enclosure 303A can be made of aluminum, or another metallic material. One or more of data ports 303A can be USB ports, and one or more of data ports 303A can be Bluetooth transceiver ports. In other embodiments dongle system 104 can include digital visual interface ports, display ports, E-SATA ports, FireWire ports, PS/2 connector ports, serial ports, VGA ports, SCSI ports, HDMI ports, and/or audio ports.

FIG. 3B is a diagram of an exemplary dongle system 104, consistent with embodiments of the present disclosure. Enclosure 301B can be a housing similar to enclosure 301A. In some embodiments enclosure 301B can enable one or more peripheral devices to communicate directly with one another without one or more mobile computing devices being present.

Port 303B and port 311B can be data ports such as USB ports. Port 303B and port 311B can be connectors comprising a plug (not shown) that can be inserted into a receptacle (not shown). In some embodiments the receptacle can be a USB type A receptacle, USB type B receptacle, USB Mini-A receptacle, USB Mini-AB receptacle, USB Mini-B receptacle, USB Micro-A receptacle, USB Micro-AB receptacle, or a USB Micro-B receptacle, and the plug can be a USB type A plug, USB type B plug, USB Mini-A plug, USB Mini-AB plug, USB Mini-B plug, USB Micro-A plug, USB Micro-AB plug, or a USB Micro-B plug. In some embodiments some plugs can fit into one or more receptacles (i.e., forward and backward compatibility). For example a USB Micro-A plug and a USB Micro-B plug can be inserted into a USB Micro-A receptacle and USB Micro-B receptacle respectively, and they can also be inserted into a USB Micro-AB receptacle as well.

Port 303B can be connected to controller 317B via bus 307B. In some embodiments, bus 307B and bus 319B can transfer digital information between port 303B and controller 317B and port 311B and controller 317B respectively. Bus 307B can send power from a device connected to port 303B to controller 317B, and in other embodiments, bus 307B can send power to a device connected to port 303B from controller 317B. Yet in other embodiments, both power and digital information can be transferred between port 303B and controller 317B.

Port 311B can be connected to controller 317B through device controller 321B via bus 319B. Bus 319B can send power from a device connected to port 311B to device controller 321B, and in other embodiments, bus 319B can send power to a device connected to port 311B from device controller 321B. Yet in other embodiments, both power and digital information can be transferred between port 311B and device controller 321B.

Device controller 321B can be a peripheral/host controller containing digital logic and analog circuitry necessary to host a USB compliant peripheral device. Device controller 321B can include a Serial Peripheral Interface Bus (SPI) bus and SPI interface. Device controller 321B can send signals to one or more peripheral devices connected to port 311B in response to one or more instructions received from controller 317B, instructed the peripheral device to perform one or more functions. For example, controller 317B can receive an input from a pointing device (not shown) via port 311B, to print a document, using a printer (not shown) connected to port 323B. In such a situation, device controller 317B can send one or more signals (e.g., instructions) to device controller 321B requesting device controller 321B to instruct the printer to print a document displayed on the mobile computing device connected to port 303B. For instance, controller 317B can receive a first signal, from a pointing device connected to port 311B through an operating system running on a mobile computing device connected to port 303B, to print a document on the mobile computing device. Controller 317B can then begin receiving data about the document from the mobile computing device, and can instruct device controller 321B to forward the data to the printer connected to port 323B. The printer can then begin printing the document.

In some embodiments, device controller 321B can send instructions (feedback) to controller 317B from a peripheral device connected to port 311B. For instance, if a printer connected to port 311B, as described above, is printing a document and the printer runs out of paper or toner, the printer can send a signal to device controller 321B notifying device controller 321B that the printer is out of paper or toner. Device controller 321B can then send a signal to controller 317B instructing controller 317B to stop sending data related to the document. Controller 317B can then send an error message signal, to a mobile computing device (i.e., mobile computing device that initiated printing), indicating that the printer has run out of paper or toner.

Dongle system 104 can also include wireless host module 315B and antenna 313B. Wireless host module 315B can support any wireless protocol, such as one or more of the following wireless protocols: Bluetooth, Wi-Fi, Zigbee, WirelessHART, and/or 6LoWPAN. Antenna 313B can send and receive wireless signals to peripheral devices not connected to a port thereby enabling a mobile computing device (not shown) connected to port 303B to interface with one or more peripheral devices through dongle system 104.

Controller 317B can be a microcontroller with USB On-The-Go (OTG) capabilities with a SPI bus. Controller 317B can be a PIC32 microcontroller, NXP-ARM microcontroller, PIC24FJ256GB210 microcontroller, or any other microcontroller that supports USB (OTG) and a SPI bus. Microcontroller 317B can have one or more pin-outs that can enable one or more controllers (e.g., device controller 321B and device controller 315B) to be connected to it.

Figure 4:
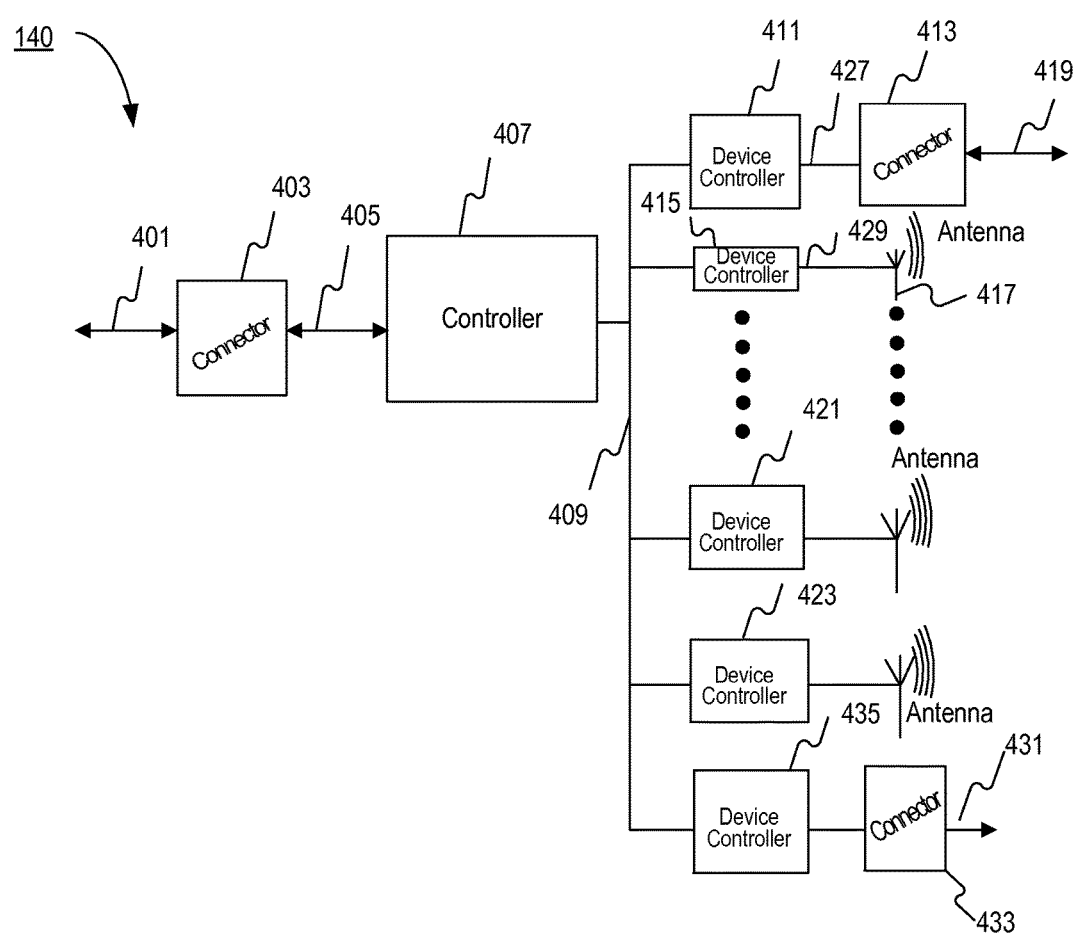
FIG. 4 is a diagram of an exemplary dongle system, consistent with embodiments of the present disclosure.

FIG. 4 is a diagram of an exemplary dongle system, consistent with embodiments of the present disclosure. FIG. 4 illustrates a circuit diagram that can be used to enable a mobile computing device to connect to one or more peripheral devices, and to control the one or more peripheral devices by filtering messages (e.g., commands) exchanged between the mobile computing device and the one or more peripheral devices. The dongle system can intercept one or more messages from one or more peripheral devices connected to it through device controllers 411-435 and can designate one or more channels over which the messages can be sent to the mobile computing device connected to the dongle system. The intercepted messages (e.g., filtered messages) can in turn be forwarded from the dongle system to an operating system running on the mobile computing device or an operating system hosted on a remote desktop client that can be accessible via a virtual desktop application running on the mobile computing device.

Communication link 401 can be a connection formed between a mobile computing device (not shown) and connector 403. Communication link 401 can be a USB connection between a mobile computing device and connector 403. Communication link 405 can be a connection formed between connector 403 and controller 407. Bus 409 can be a connection between one or more device controllers 411, 415, 421, 423, 425 and controller 407. Bus 409 can enable one or more device controllers to communicate with one another or controller 407 to communicate with one or more device controllers. One or more device controllers can communicate with one or more connectors and/or one or more antennas. For instance, communication link 427 can form a connection between device controller 411 over which controller 4114 can communicate with device connector 413 and vice versa. Wireless link 429 can form a connection between device controller 415 and antenna 417 over which controller 415 can communicate with antenna 417 and vice versa. Communication link 419 can be a connection formed between device connector 413 and a peripheral device (not shown). A wireless link (not shown) can be formed between antenna 417 and one or more peripheral devices (not shown) over which antenna 417 can communicate with one or more peripheral devices.

A mobile computing device connected to connector 403 via communication link 401 can communicate with one or more peripheral devices using a combination of wired and wireless connections. For example, an operating system running on a mobile computing device can receive an input from a keyboard and pointing device connected to antenna 417, and may output information to a monitor connected to connector 413 via communication link 419 and an audio receiver connected to connector 433 via communication link 431. For instance, a mobile computing device can receive input from a pointing device to highlight a Uniform Resource Locator (URL) field, and receive an input from a keyboard to enter a URL (e.g., YouTube) corresponding to multimedia content (e.g., movie) into the URL field. After the mobile computing device has received an input from the keyboard identifying the URL, the mobile computing device can receive an input from either the keyboard or pointing device to access the content on the page corresponding to the URL. The mobile computing device can then receive video and audio content associated with the content on the page associated with the URL and can send the content to controller 407, which can send the video content to the monitor connected to connector 413 and audio content to the audio receiver connected to connector 429.

Figure 5A:
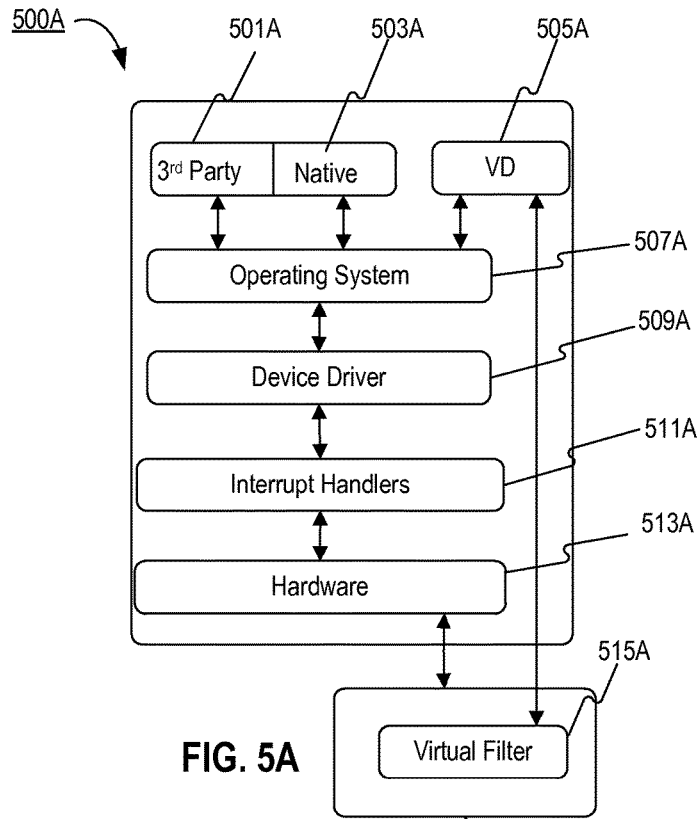
FIG. 5A is a diagram of an exemplary mobile computing device input-output stack, consistent with embodiments of the present disclosure.

FIG. 5A is a diagram of an exemplary mobile computing device input-output stack, consistent with embodiments of the present disclosure, and dongle system. The mobile computing device input-output stack, unlike conventional mobile computing device input-output stacks (e.g., Android OS, Mac iOS), can have a virtual desktop agent installed that can process signals received from a dongle system, as described above, from one or more peripheral devices. Additionally the mobile computing device input-output stack can establish a connection between the dongle system and the operating system running on the mobile computing device, or an operating system running on a remote desktop client that is accessible via the virtual desktop agent. Existing mobile computing devices use an operating system running on the mobile computing device to process signals generated by one or more peripheral devices instead of processing the signals using a virtual filter and virtual desktop agent. The input-output stack as disclosed herein provides an option as to whether one or more peripheral devices will be used with an operating system on the mobile computing device (local operating system), an operating system hosted on a remote desktop client (remote operating system) via a virtual filter and virtual desktop agent, or a combination of the local operating system and remote operating system.

Input-Output stack 500A can be an input-output software stack. Hardware 513A can include, but is not limited to, one or more central processing units (CPUs), one or more chipsets (e.g., microcontrollers), one or more memories, one or more input-output buses or interconnects, one or more input-output controllers or adaptors, and one or more input-output devices (e.g., keyboard or display on mobile computing device).

Interrupt handlers 511A can be can be a function in microcontroller firmware, an extension of device driver 509A, whose execution can be triggered by the reception of an interrupt. An interrupt can be a signal emitted from hardware or a piece of software running on a mobile computing device to one or more processors indicating an event that needs immediate attention. An interrupt can alert a processor to a high-priority condition requiring interruption of code currently being executed on one or more processors running on a mobile computing device. The one or more processors can respond by suspending its current activities, saving its state, and executing an interrupt handler to deal with the event.

Interrupt handlers 511A can process hardware interrupts and software interrupts. If interrupt handlers 511A receives a hardware interrupt, interrupt handlers 511A can receive a signal from a hardware device on a mobile computing device such as a disk controller or from a peripheral device (e.g., pointing device, keyboard, monitor, etc.) when a peripheral device is connected to the mobile computing device via a data port or wireless connection as explained above. If interrupt handlers 511A receives a software interrupt, interrupt handlers 511A can receive a signal from one or more processors on a mobile computing device caused by a condition in the one or more processors, or a special instruction in an instruction set that causes an interrupt when the special instruction is executed. Interrupt handlers 511A can receive from one or more processors a signal that is caused by a condition in the one or more processors, if an error or event occurs during program execution that cannot be handled within a program being executed on the processor that generated the signal. For example, if arithmetic unit on one or more processors is commanded to divide a number by zero, a divide-by-zero exception can be generated by the one or more processors causing a mobile computing device to abandon the calculation or display an error.

Device drivers 509A can be one or more computer programs that operate or control one or more peripheral devices (e.g., printer, external display, keyboard, flash drive, Ethernet cable, etc.). Device drivers 509A can provide one or more software interfaces to hardware devices, enabling operating system 507A and other computer programs (not shown) to access hardware functions on hardware 513A without needing to know precise details of how hardware 513A is being used. For example, device drivers 509A can communicate with one or more peripheral devices through a computer bus (not shown) or communication subsystem to which hardware 513A connects. If a calling program invokes a routine in device drivers 509A, device driver 509A can issue commands to one or more peripheral devices. If the one or more peripheral devices sends data back to device drivers 509A, device drivers 509A can invoke routines in a program that originally called (e.g., requested access to) the one or more peripheral devices. In some embodiments, device drivers 509A can be hardware-dependent and operating-system specific. Device drivers 509A can also, in some embodiments, provide interrupt handling for any asynchronous time-dependent hardware interface.

Operating system 507A can be one or more pieces of software that manages hardware 513A, $3^{rd}$ party applications 501A, native applications 503A, and virtual desktop application (VD) 505A. In some embodiments operating system 507A can include time-sharing scheduling tasks for efficient use of resources on a mobile computing device and can also include accounting software for cost allocation of processor time, mass storage, printing, and other resources. Operating system 507A can act as an intermediary between hardware 513A and one or more application software programs (e.g., $3^{rd}$ party applications 501A, native applications 503A, and/or virtual desktop application 505A) when hardware 513A invokes functions such as input and output and memory allocation. In some embodiments, operating system 507A can be an Android operating system, iOS operating system, Windows Phone operating system, BlackBerry operating system, QNX operating system.

$3^{rd}$ party applications 501A can be one or more third party software applications that can be installed either by a user of a mobile computing device, or can be installed by a secondary seller of the mobile computing device. In the first instance, a user who has purchased a mobile computing device from a service provider (e.g., Vodafone™) can install a $3^{rd}$ party application such as Google Maps™ after purchasing the mobile computing device. In the second instance, a secondary seller of a mobile computing device such as Vodafone™ who purchased the mobile computing device from a mobile computing device manufacturer (e.g., Apple) can install a $3^{rd}$ party application (e.g., Google Maps™) prior to a user purchasing the mobile computing device. $3^{rd}$ party applications 501A can be any application that is not developed by a manufacturer of operating system 507A.

Native applications 503A can be one or more software applications installed when operating system 507A is installed on a mobile computing device. For example, an application installed on a mobile computing device designed to receive input for sending SMSs and to display output of SMSs received from another mobile computing device can be a native application. For instance, iMessage™ can be a native SMS application for sending and receiving SMSs on an iPhone™. Similarly, Android Jelly Bean Messaging™ SMS can be a native SMS application for sending and receiving SMSs on an Android device.

Virtual desktop application 505A can be an application that can enable operating system 507A to log into an operating system (e.g., Windows™ operating system, MAC OS X™) hosted on a remote desktop client. Virtual desktop application 505A can include a virtual desktop agent and/or a virtual desktop infrastructure that can enable one or more applications in native applications 503A and operating system 507A to interact with one or more operating systems hosted on a remote desktop client.

Virtual filter 515A can be a software filter that can receive one or more interrupts from one or more device controllers associated with one or more peripheral devices connected to dongle system 104. Virtual filter 515A can, translate the interrupts into interrupts that can be recognized by an operating system hosted on a remote desktop client, and forward the interrupts to virtual desktop application 505A, which forwards the translated interrupts to the operating system hosted on the remote desktop client. Virtual filter 515A can also receive interrupts and/or instructions from an operating system hosted on a remote desktop client through virtual desktop application 505A, translate the interrupts and/or instructions, and forward the interrupts and/or instructions to interrupt handlers installed on dongle system 104 which can send control signals to one or more peripheral devices (not shown) attached to dongle system 104.

While this embodiment discloses a filter that interacts with a virtual desktop application, in some embodiments the virtual filter can interact with the operating system, one or more third party applications, and/or native applications.

In some embodiments dongle system 104 can communicate directly with hardware 513A, instead of communicating with virtual desktop application (VD) 505A. For instance, a user may want to use one or more peripheral devices, connected to a dongle system, to interact with an application running on the mobile computing device. For example, a user can open an application that can enable the phone to place a phone call, by using a pointing device (mouse) to open the application, and a keyboard to dial the phone number that the user wishes to connect to. In some embodiments the application can be included in native applications 503A, and in other embodiments the application can be included in $3^{rd}$ party applications 501A. In either case, virtual filter 515A can send one or more signals generated by the pointing device and keyboard to the application via the layers of input-output stack 500. The application can then instruct operating system 507A to initiate the phone call using one or more wireless radios (not shown) included in hardware 513A. As a result, a communication channel can be established between dongle system 104 and hardware 513A.

Figure 5B:
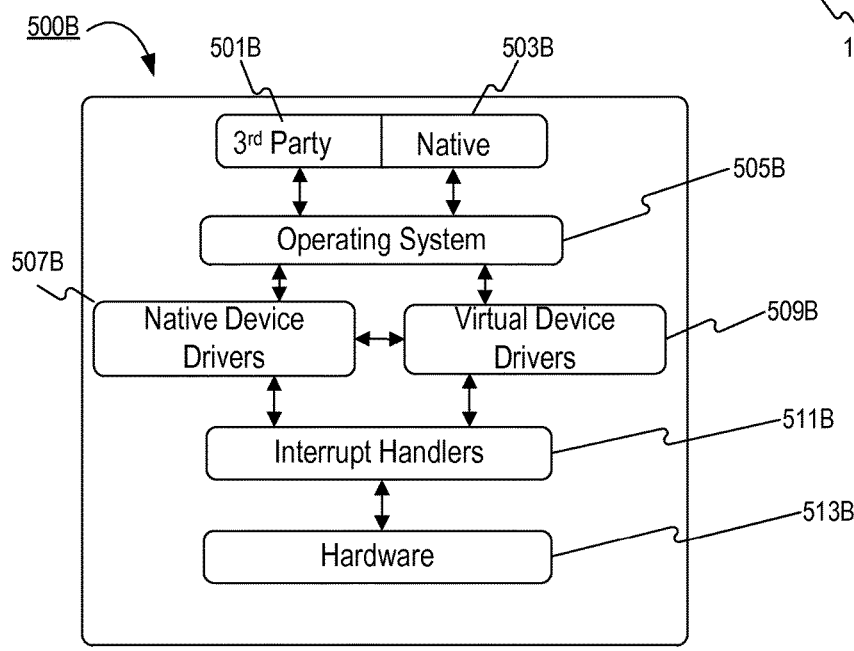
FIG. 5B is a diagram of an exemplary mobile computing device input-output stack, consistent with embodiments of the present disclosure.

In some embodiments, virtual filter 515A and virtual desktop application 505A can be combined into a single function and a mobile computing device can exchange control signals between one or more peripheral devices attached to dongle system 104, and an operating system hosted on a remote desktop client as shown in FIG. 5B. In other embodiments, the functionality of dongle system 104 can be implemented on a mobile computing device equipped with the input-output stack disclosed in FIG. 5B, thereby eliminating the need for dongle system 104. In this embodiment, the input-output stack can be implemented in a combination of firmware, hardware, and or software.

Virtual device drivers 509B can receive one or more interrupts from native device drivers 507B and forward the interrupts to an operating system hosted on a remote desktop client through operating system 505B and can similarly receive interrupts or instructions from an operating system hosted on a remote desktop client through operating system 505B.

$3^{rd}$ party applications 501B can be one or more third party software applications that can be installed either by a user of a mobile computing device, or can be installed by a secondary seller of the mobile computing device. In the first instance, a user who has purchased a mobile computing device from a service provider (e.g., Vodafone™) can install a $3^{rd}$ party application such as Google Maps™ after purchasing the mobile computing device. In the second instance, a secondary seller of a mobile computing device such as Vodafone who purchased the mobile computing device from a mobile computing device manufacturer (e.g., Apple) can install a $3^{rd}$ party application (e.g., Google Maps) prior to a user purchasing the mobile computing device. $3^{rd}$ party applications 501B can be any application that is not developed by a manufacturer of operating system 505B.

Native applications 503B can be one or more software applications installed when operating system 505B is installed on a mobile computing device. For example, an application installed on a mobile computing device designed to receive input for sending SMSs and to display output of SMSs received from another mobile computing device can be a native application. For instance, iMessage™ can be a native SMS application for sending and receiving SMSs on an iPhone™. Similarly, Android Jelly Bean™ Messaging SMS can be a native SMS application for sending and receiving SMSs on an Android™ device. Interrupt handlers 511B can send control signals to one or more peripheral devices (not shown) attached to hardware 513B via a dongle system.

Figure 6:
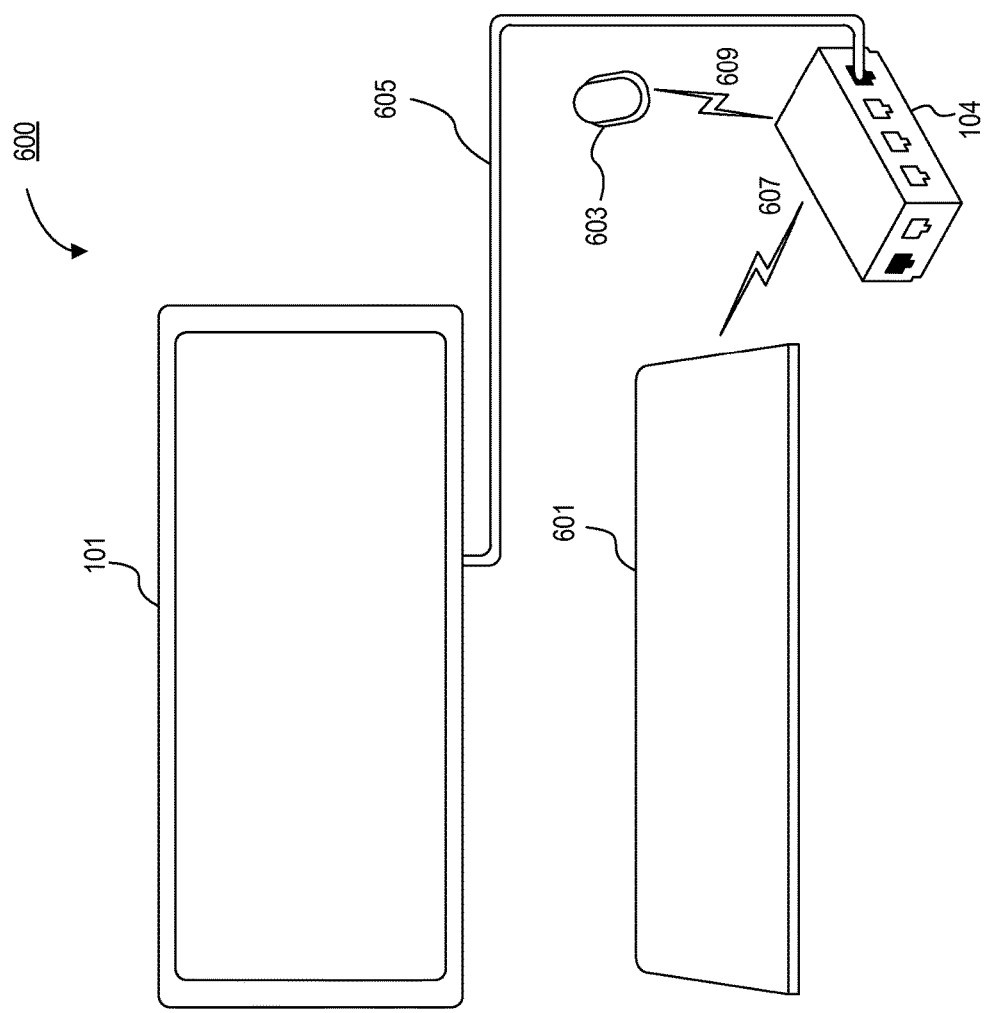
FIG. 6 is a diagram of an exemplary system, consistent with embodiments of the present disclosure.

FIG. 6 is a diagram of an exemplary system, consistent with embodiments of the present disclosure. System 600 comprises keyboard 601, pointing device 603 (e.g., mouse, stylus, and/or finger), dongle system 104 (further described below), mobile computing device 101, connecting cable 605. Keyboard 601 and pointing device 603 may be referred to as peripheral devices. Keyboard 601 and pointing device 603 may communicate with dongle 104 using wireless links 607 and 609 respectively. Wireless links 607 and 609 can be RF (Radio Frequency) signals that are sent between one or more peripheral devices and dongle 104. In some embodiments wireless links 607 and 609 can be Bluetooth™ wireless links, Wi-Fi™ wireless links, Zigbee™ wireless links, WirelessHART™ wireless links, 6LoWPAN™ wireless links, or any other type of wireless link. In some embodiments a combination of different wireless links can be used depending on the wireless communication protocol supported by the peripheral devices. For instance, keyboard 601 may only support a Wi-Fi™ wireless link, and pointing device 603 may only support a Zigbee™ wireless link.

Keyboard 601 and pointing device 603 may also be connected to dongle 104 via a connecting cable similar to connecting cable 605. Connecting cable 605 can be a Universal Serial Bus (USB™) connecting cable, FireWire™ connecting cable, MIDI™ connecting cable, eSATA™ (external Serial AT Attachment) connecting cable, Thunderbolt™ connecting cable, and/or any other type of wired link. In some embodiments, dongle 104C can support one or more of the aforementioned connecting cables. For instance, peripheral devices requiring higher data rate connecting cables can use USB™ whereas peripheral devices that do not require high date rates can use FireWire™ connecting cables. As an example, keyboard 601 and pointing device 603 can use FireWire™ connecting cables and mobile computing device 101 can use USB™ connecting cables. In another example, a user can decide to use different USB™ connecting cables depending on the data rate required by the peripheral device. For instance, for peripheral devices that do not require high data rates (e.g., keyboard 601 and pointing device 603) USB 2.0™ or higher can be used. Peripheral devices that do require high data rates (e.g., mobile computing device 101) can use USB 3.0™.

Dongle 104 provides a user with the ability to interact with mobile computing device 101 the same way they would interact with a standard desktop or laptop computer.

Figure 6A:
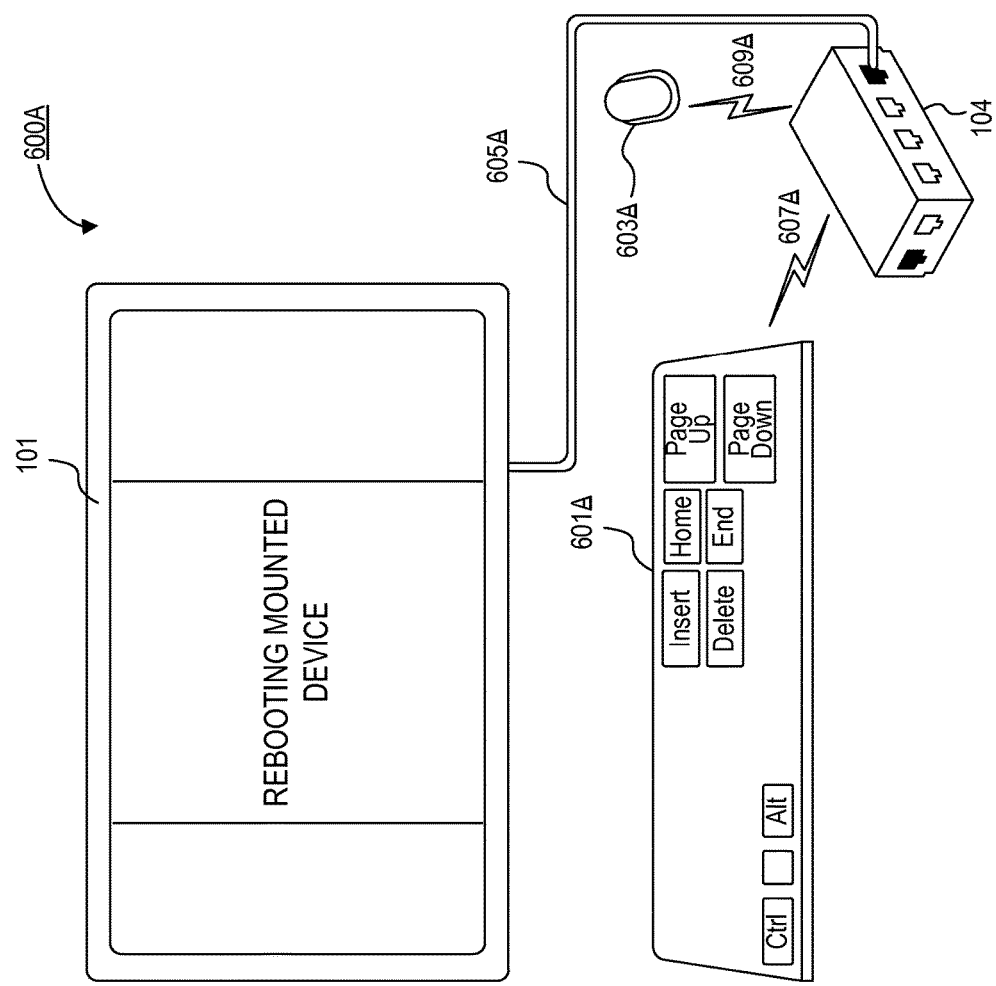
FIG. 6A is a diagram of an exemplary system, consistent with embodiments of the present disclosure.

FIG. 6A is a diagram of an exemplary system, consistent with embodiments of the present disclosure, displaying a mobile operating system message generated by mobile computing device 101 when a user enters a "keyboard shortcut" command In some embodiments, a mobile operating system can generate a message that is different from a message produced by an operating system running on a personal computer when a user enters the same keyboard shortcut. For example, if a user enters a keyboard shortcut "CTRL-ALT-DELETE" and a mobile operating system running on mobile computing device 101 may generate a 'REBOOTING MOUNTED DEVICE" message indicating to the a user that mobile computing device 101 is shutting down and will be rebooted. If however, a user enters the same keyboard shortcut command on a personal computer operating system (e.g., Windows OS™) running on a remote desktop client the personal computer operating system may generate a different message. For example, if a user enters "CTRL-ALT-DELETE" the personal computer operating system running on the remote desktop client may display a login screen on mobile computing device 101.

Figure 6B:
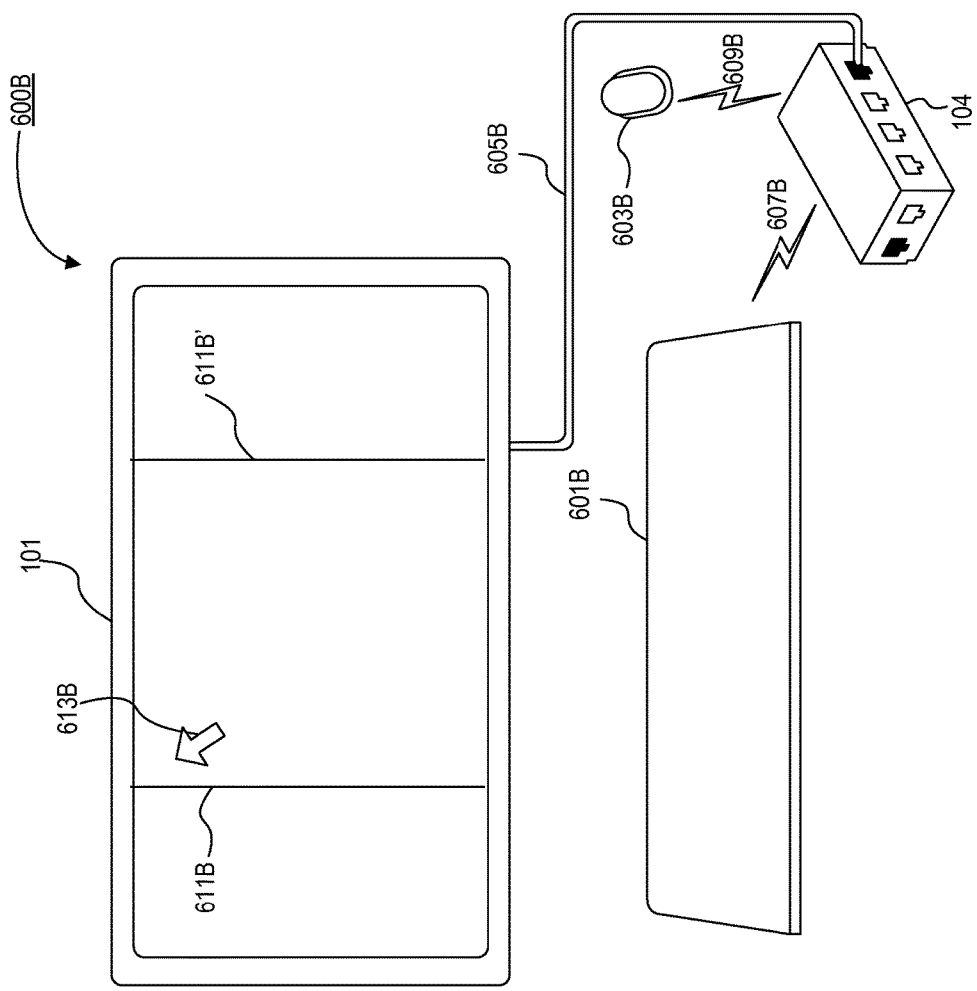
FIG. 6B is a diagram of an exemplary system, consistent with embodiments of the present disclosure.

The entire area of an external display may not be used depending on whether or not a user is logged into a remote desktop client. For instance in FIG. 6B a user may attempt to navigate a cursor (e.g., cursor 613B) to the leftmost edge of mobile computing device 101 using pointing device 603B, but the cursor may not extend beyond a certain predefined boundary if the user is not logged into a remote desktop client. For example, mobile computing device 101 can display cursor 613B in a location limited to the area enclosed by the top and bottom of mobile computing device 101 and screen boundary 611B and screen boundary 611B'. Therefore the entire area of mobile computing device 101 may not be used if a user is not logged into a remote desktop client.

Figure 6C:
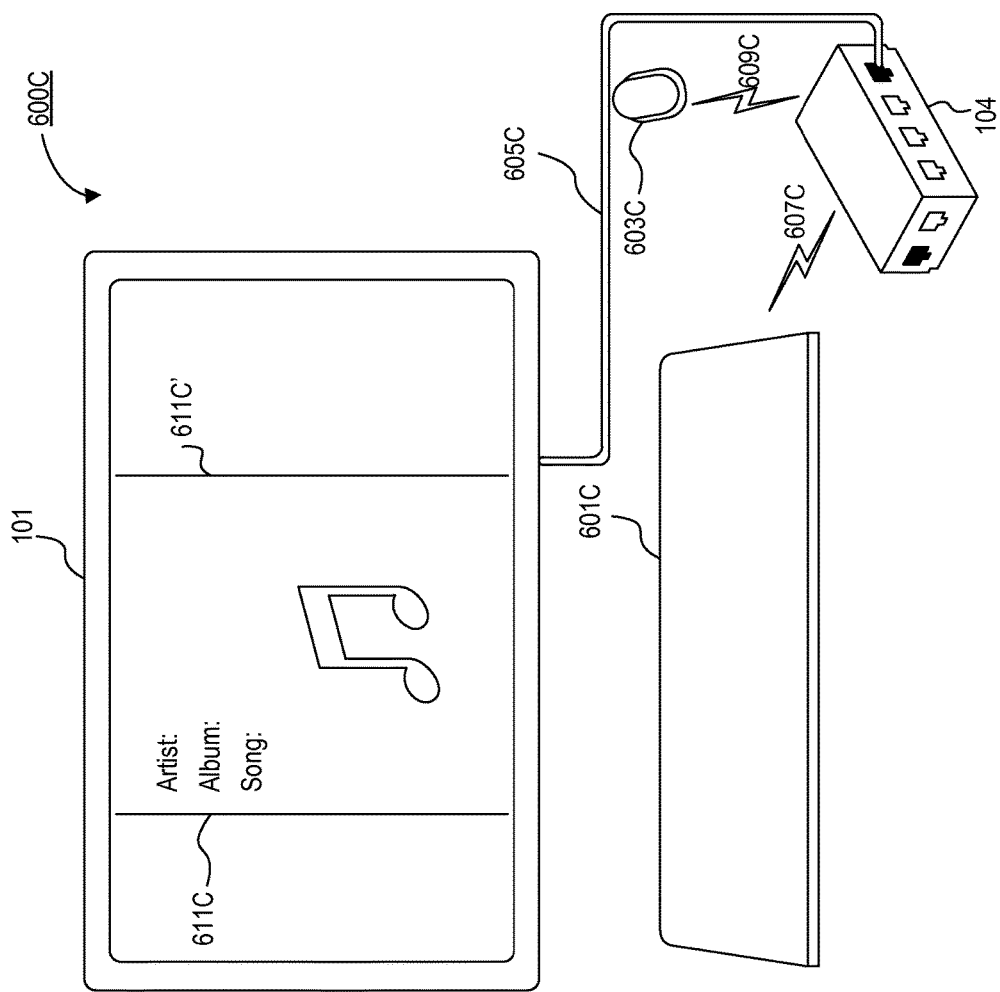
FIG. 6C is a diagram of an exemplary system, consistent with embodiments of the present disclosure.

Similarly, applications can be confined to a predetermined area as shown in FIG. 6C. A user can open an application on mobile computing device 101, and mobile computing device 101 can display the application in an area confined by the top and bottom of mobile computing device 101 and boundary 611C and boundary 611C'. However, the application running on mobile computing device 101 may occupy the entire display of mobile computing device 101.

In some embodiments, a user can partition a screen displayed on a mobile computing device so that applications running on the mobile computing device are limited to an area enclosed by the same area described above, but applications running on a remote desktop client can be displayed in partitions outside of the enclosed area. For instance, a user can simultaneously display an application (e.g., Short Message Service) running on a mobile computing device display and one or more applications (e.g., Microsoft Word™) running on a remote desktop client in different portions of an external display. As an example an audio application can be displayed within a designated area as described above, and Microsoft Word™ can be displayed in an area of mobile computing device 101 that is not occupied by the audio application. Alternatively, the orientation of applications running on a mobile computing device and a remote desktop client can be reversed.

Figure 6D:
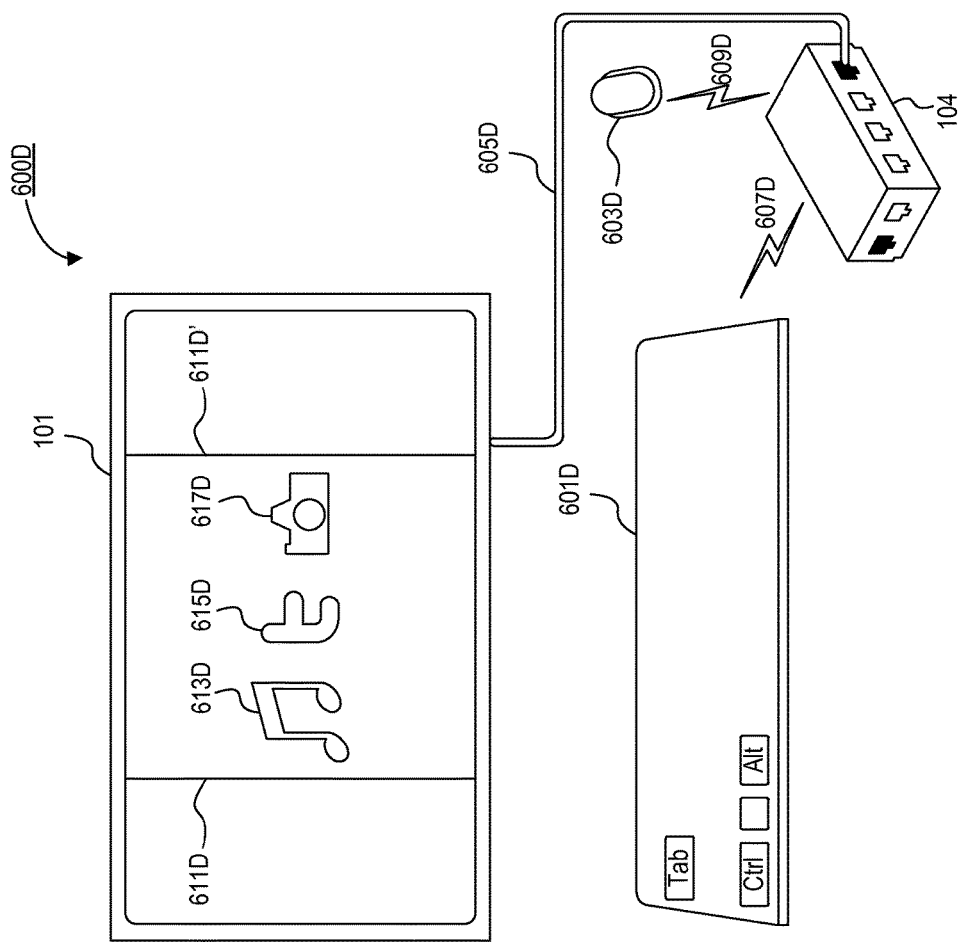
FIG. 6D is a diagram of an exemplary system, consistent with embodiments of the present disclosure.

Another shortcut keyboard command that a user can enter is "ALT-TAB," which enables a user to switch between one or more applications running on mobile computing device 101, as shown in FIG. 6D. If a user is logged into a remote desktop client, and is interacting with one or more applications hosted by the remote desktop client using keyboard 601D or pointing device 603D the user may not be able to switch between the one or more applications that they are interacting with on the remote desktop client. However in some embodiments, as explained below, a user can switch between applications hosted by a remote desktop client and applications running on mobile computing device 101 by entering the "ALT-TAB" keyboard shortcut command.

In FIG. 6D, mobile computing device 101 is displaying application icons 613D, 615D, and 617D corresponding to applications running on mobile computing device 101. The area of mobile computing device 101 occupied by an application that displays which application icons a user is switching between can be limited to the area enclosed by boundary 611D and 611D'.

When a mobile computing device is logged into a remote desktop client and a keyboard shortcut command is invoked by a keyboard connected to the mobile computing device, the mobile computing device can display an output on an external display connected to the mobile computing device generated by an operating system hosted on the remote desktop client. In some embodiments an output generated by an operating system hosted on a remote desktop client can simultaneously be displayed on a mobile computing device connected to an external display and a display on the mobile computing device. In other embodiments an output generated by an operating system hosted on a remote desktop client can be displayed on an external display connected to a mobile computing device, and other applications running on the mobile computing device can be displayed on a display on the mobile computing device.

Figure 6E:
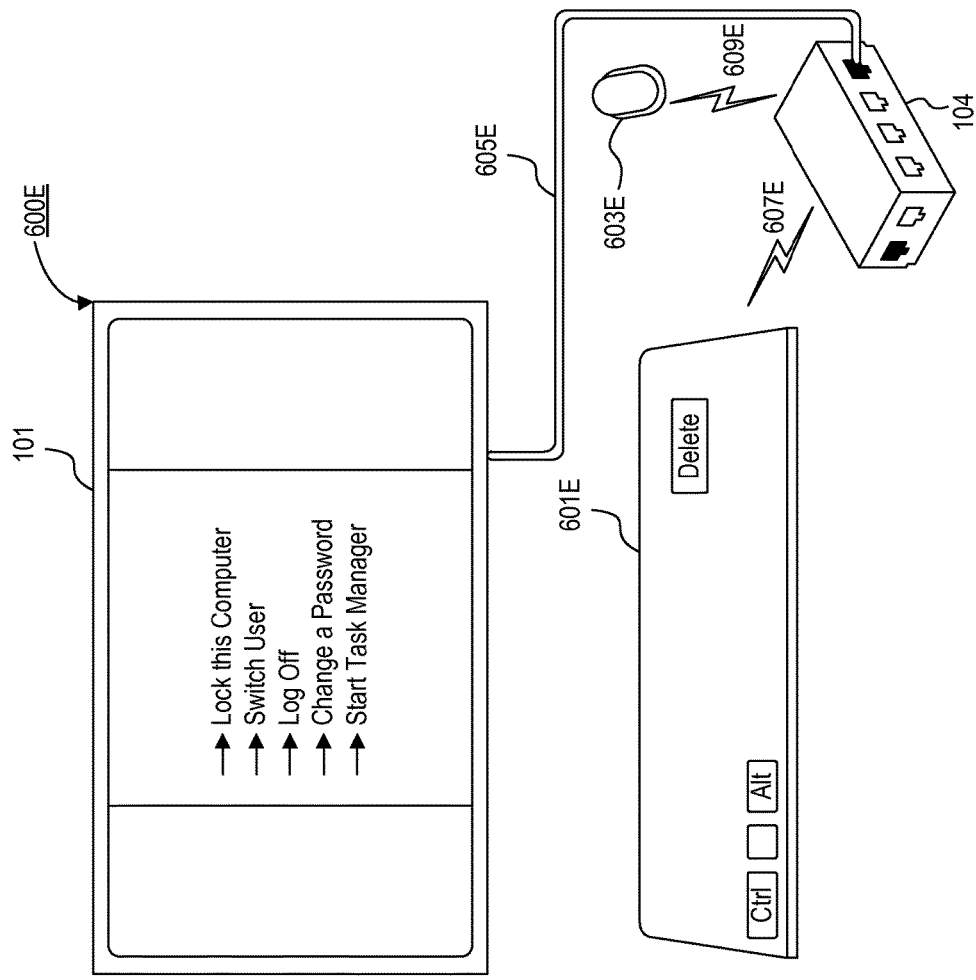
FIG. 6E is a diagram of an exemplary system, consistent with embodiments of the present disclosure.

For instance, in FIG. 6E mobile computing device 101 can display a plurality of options corresponding to keyboard shortcut "CTRL-ALT-DELETE" invoked by keyboard 601E as shown in FIG. 6E. In this scenario, mobile computing device 101 is logged into a remote desktop client, and keyboard shortcut command "CTRL-ALT-DELETE" invokes an operating system hosted on the remote desktop client to generate the options displayed on mobile computing device 101.

When a mobile computing device is logged into a remote desktop client, and the mobile computing device is interacting with an application installed on an operating system hosted on a remote desktop client the mobile computing device can simultaneously display the application through a display on the mobile computing device and through an external display connected to the mobile computing device through a dongle. When a mobile computing device is interacting with one or more applications installed on an operating system hosted on a remote desktop client the mobile computing device can display the one or more applications on an external display without restricting the display of the one or more applications to a certain area of the external display as when a mobile computing device is not logged into a remote desktop client.

Figure 6F:
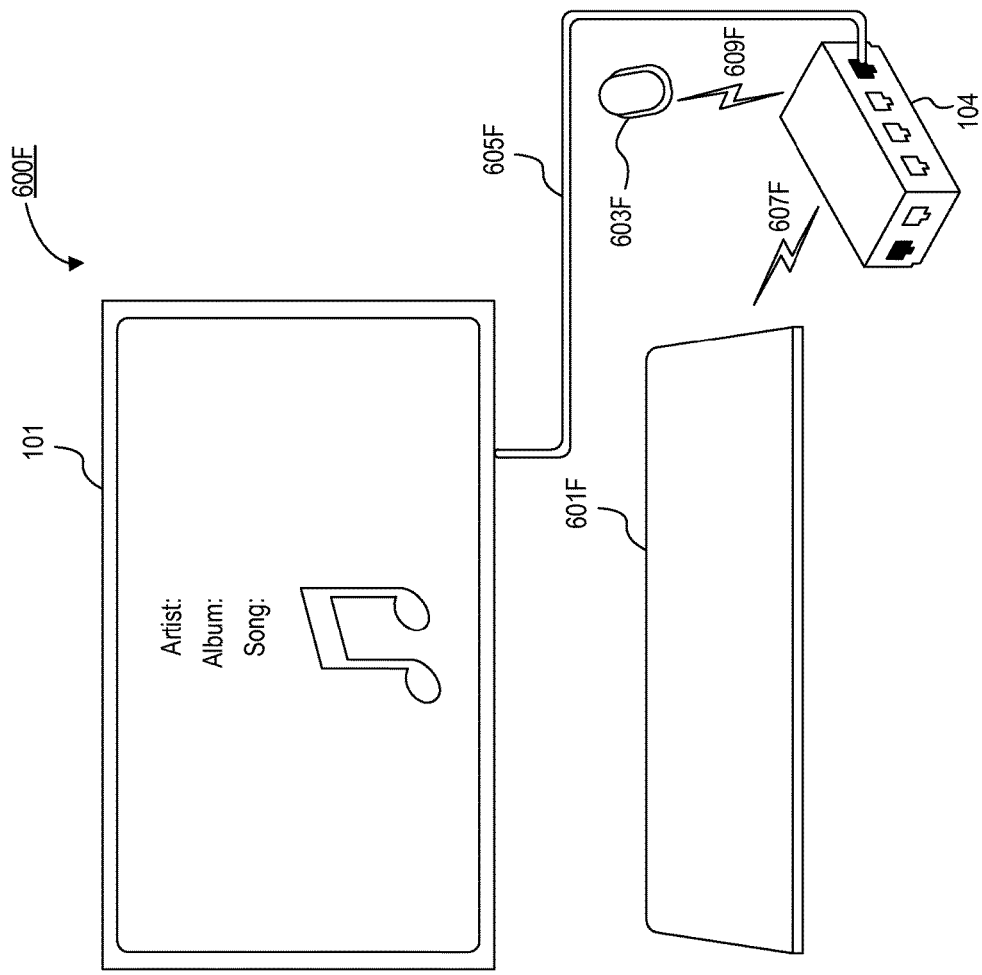
FIG. 6F is a diagram of an exemplary system, consistent with embodiments of the present disclosure.

For instance, in FIG. 6F mobile computing device 101 can display an application through a display on mobile computing device 101 so that the application occupies the entire area of mobile computing device 101 when mobile computing device 101 is logged into a remote desktop client hosting an operating system with the application running on it.

In some embodiments, when a mobile computing device is logged into a remote desktop client, and the mobile computing device is interacting with one or more applications installed on the operating system hosted on the remote desktop client, the mobile computing device can display on an external display (not shown) the applications that the mobile computing device is interacting with installed on the operating system hosted on the remote desktop client, while simultaneously displaying through a display on the mobile computing device the applications installed on the mobile computing device.

Figure 6G:
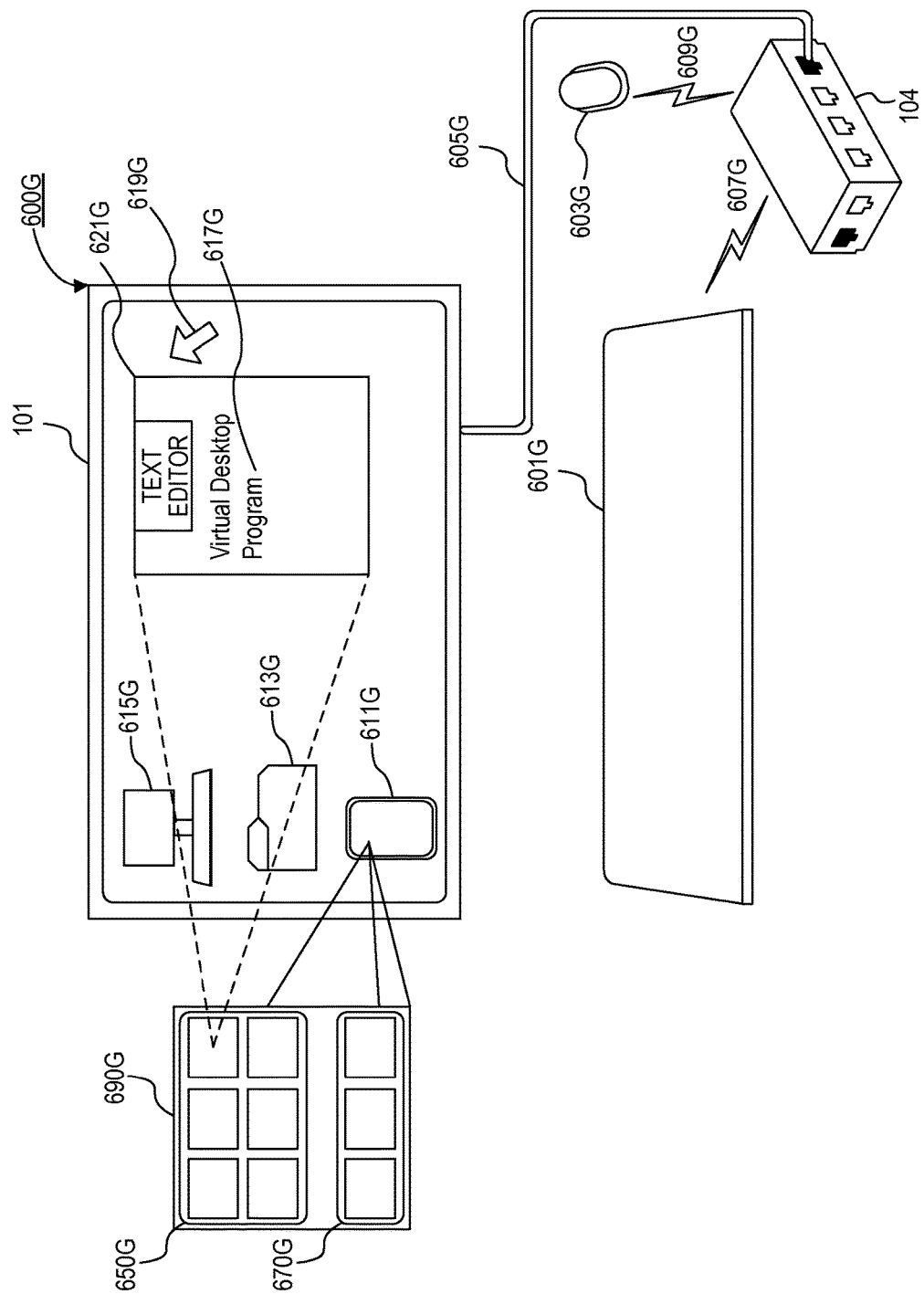
FIG. 6G is a diagram of an exemplary system, consistent with embodiments of the present disclosure.

For instance, in FIG. 6G mobile computing device 101 can display through a display on mobile computing device 101 one or more application icons 650G and 670G corresponding to applications that may or may not be active on mobile computing device 101, and mobile computing device 101 can simultaneously display application icons 615G, 613G, and 611G corresponding to applications running on an operating system hosted by a remote desktop client. Application icon 615G can be an icon representing one or more virtual or physical hard disks hosted by a remote desktop client. Application icon 613G can be an icon representing one or more file systems hosted by a remote desktop client. Application icon 611G can be an icon representing a mounted version of mobile computing device 101. Window 621G can represent an application (e.g., Text Editor™) installed on mobile computing device 101 represented by an application icon included in application icons 650G. Mobile computing device 101 can display a cursor 617G and arrow 619G that can display input from keyboard 601G and pointing device 603G respectively.

When a mobile computing device is logged into a remote desktop client, keyboard shortcut commands can affect applications installed on an application hosted by the remote desktop client as well as the operating system depending on the keyboard shortcut entered.

Figure 6H:
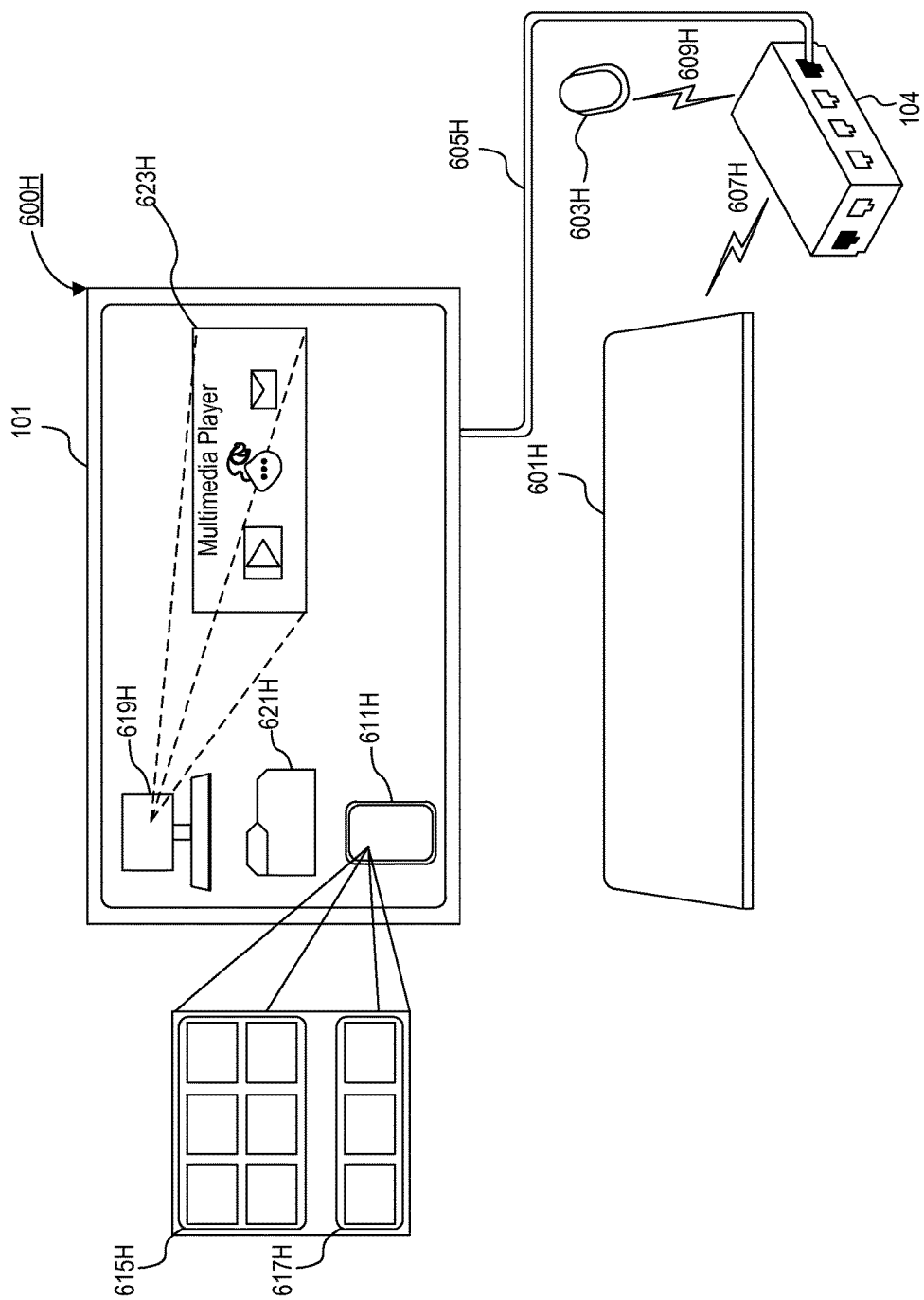
FIG. 6H is a diagram of an exemplary system, consistent with embodiments of the present disclosure.

For instance, in FIG. 6H if mobile computing device 101 receives keyboard shortcut "ALT-TAB" from keyboard 601H, mobile computing device 101 can switch between displaying icons representing applications currently running on an operating system hosted by a remote desktop client. Application icon 619H can be an icon representing one or more virtual or physical hard disks hosted by a remote desktop client, and window 623H can represent an application presenting icons representing applications that are running on an operating system hosted on a remote desktop client. If keyboard shortcut command "ALT-TAB" is invoked by keyboard 601H, window 623H can display application icons in different orders depending on the number of times the command is invoked.

Figure 7:
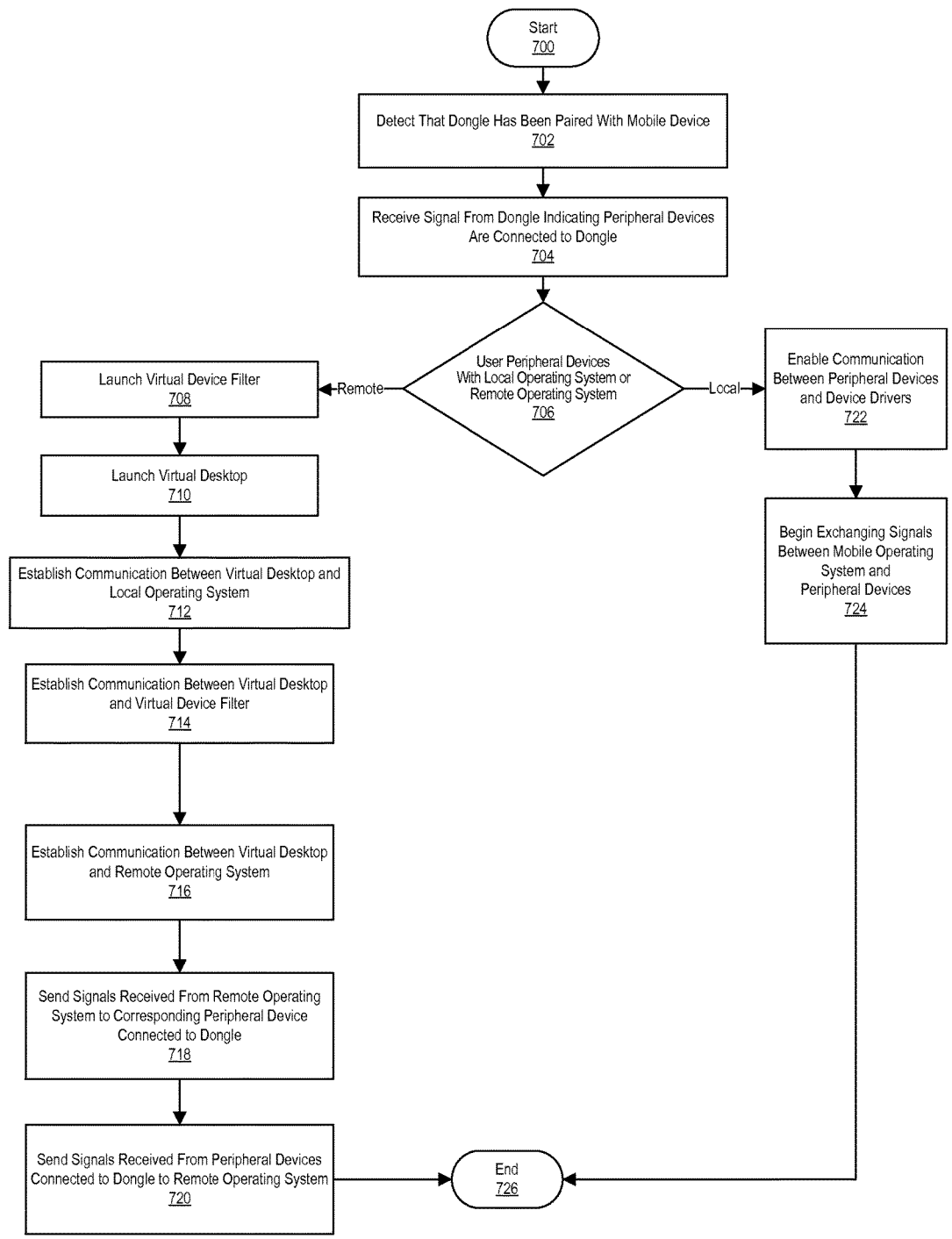
FIG. 7. is a flowchart representing exemplary methods for exchanging signals between a dongle system and a remote desktop client.

FIG. 7 is a flowchart representing exemplary methods for exchanging signals between a dongle system (e.g., dongle system 104) and a remote desktop client. It will be readily appreciated that the illustrated procedure can be altered to delete steps or further include additional steps. While the following description is directed to the method being performed by a mobile computing device (e.g., mobile computing device 101), it is appreciated that the method can be performed in whole or in part by a device other than the mobile computing device (e.g., dongle system 104). The exemplary methods described herein for exchanging signals between a dongle system and a remote desktop client can enable a user to interact with (i.e., use) one or more remote computers (virtual and/or real) by logging into a remote desktop client that controls the one or more remote computers.

After initial start step, the mobile computing device can detect whether a dongle system has been paired with it (702). The mobile computing device can detect when a dongle system has been paired with it if it receives a signal from the dongle system. In some embodiments, the signal received from the dongle system can be an information signal. For instance, the mobile computing device can receive one or more signals from the dongle system requesting information regarding the device drivers (e.g., device drivers 509A) that can be supported by the mobile computing device. The mobile computing device can use the information signals from the dongle system to determine that the dongle system has been paired with it.

In other embodiments, the mobile computing device can experience an increased electrical load (e.g., increased impedance) when the dongle system is attached to the mobile computing device. For instance, when the dongle system is attached to the mobile computing device, the dongle system may require power to operate one or more peripheral devices that can be attached to it. After the electrical load experienced by the mobile computing device increases and the mobile computing device begins sending power to the dongle system, the mobile computing device can determine that the dongle system has been paired with it.

After the mobile computing device has detected that a dongle system has been paired with it, the mobile computing device can begin receiving signals from the dongle system indicating that one or more peripheral devices (e.g., keyboard 601 and/or pointing device 603) are connected to it (704). For example, the dongle system can send one or more signals to the mobile computing device indicating that one or more peripheral devices, such as a pointing device, keyboard, display, printer, stereo receiver, are connected to the dongle system.

After the mobile computing device has received one or more signals from the dongle system indicating which peripheral devices are connected to the dongle system, the mobile computing device can request a user to select whether the peripheral devices will be used with an operating system running on the mobile computing device (i.e., local operating system) or an operating system hosted on a remote client desktop (706). In some embodiments, the request can be presented to a user in the form of an alert on a display of the mobile computing device. In other embodiments, the request can be presented to a user as an alert on a display connected to the dongle system. In either scenario, the mobile computing device can receive a response to the request from one or more input devices. For example, a user can respond to the request by entering a response indicating that the peripheral devices will be used with the local operating system (e.g., operating system 507A) using a pointing device connected to the dongle system. In some embodiments, a user can enter a response using an input-output mechanism (e.g., touch screen interface) on the mobile computing device. In other embodiments, a user can use a keyboard connected to the dongle system to enter the response to the request.

If the mobile computing device receives a response indicating that the one or more peripheral devices will be used with an operating system hosted on a remote desktop client, the dongle system can launch a virtual filter (e.g., virtual filter 515A) in step 708. The virtual filter can be a software, firmware, or hardware filter designed to receive signals from peripheral devices connected to the dongle system, and to forward the signals to an operating system hosted on a remote desktop client. The virtual filter can also receive signals from the remote desktop client and forward the signals to the peripheral devices connected to the dongle system, and/or hardware or software running on the dongle system.

After the virtual filter has been launched, a virtual desktop application can be launched (710). In some embodiments, the virtual filter and virtual desktop application can be launched concurrently. The virtual desktop application can be a remote desktop application that can enable an operating system running on the mobile computing device to log into an operating system (e.g., Windows™ operating system, MAC OS X™) hosted on a remote desktop client. The virtual desktop application can comprise a virtual desktop agent, a virtual desktop infrastructure, or a combination of both.

After the virtual filter and virtual desktop application have been launched, the mobile computing device can establish a communication channel between an operating system installed on the mobile computing device (e.g., operating system 507A) and the virtual desktop application (712). In some embodiments, the mobile computing device can establish a communication channel between the operating system on the mobile computing device and the virtual desktop application, while the virtual filter and virtual desktop application are being launched. The communication channel can be one or more software routines that transport instructions and/or signals received at the operating system installed on the mobile computing device, from an operating system hosted on a remote desktop client, to the virtual desktop application. The communication channel can also transport instructions and/or signals received in the operating system installed on the mobile computing device, from one or more peripheral devices attached to the dongle system, to the virtual desktop application.

After the mobile computing device has established a communication channel between an operating system installed on the mobile computing device and the virtual desktop application, the mobile computing device can establish a communication channel between the virtual desktop application and one or more virtual filters on the dongle system (714). In some embodiments, the communication channel can be established between the virtual desktop application and the one or more virtual filters, as the communication channel between the operating system on the mobile computing device and the virtual desktop application is being established. The communication channel between the virtual desktop application and the one or more virtual filters can be used to send hardware interrupts received from an interrupt handler, on the dongle system, to an operating system hosted on a remote desktop client. For example, if the one or more virtual filters receive a hardware interrupt corresponding to a pointing device activating a hyperlink on a webpage running on a browser installed on an operating system hosted on a remote desktop client, the one or more virtual filters can translate the hardware interrupt into instructions that can activate the hyperlink, and send the instructions to the virtual desktop application using the communication channel.

One or more communication channels can be established between the virtual desktop application and an operating system hosted on a remote desktop client (remote operating system) in step 714, while the communication channel between the virtual desktop application and the virtual filter is being established. In some embodiments, the communication channels can be established between the virtual desktop application and an operating system hosted on a remote desktop client after the communication channel between the virtual desktop application and the virtual filter has been established. The one or more communication channels between the virtual desktop application and the remote operating system can be established by the operating system running on the mobile computing device. The operating system running on the mobile computing device can have one or more preexisting communication channels established between the mobile computing device and the remote operating system. The virtual desktop application can use one or more of the communication channels to exchange information with the remote operating system. In some embodiments, the one or more communication channels can be one or more public Internet links connecting the operating system running on the mobile computing device and the remote operating system. For instance, the operating system can establish a communication channel with the remote operating system by using one or more cellular radios in the mobile computing device that can connect to the Internet. In some embodiments, the operating system can establish a communication channel with the remote operating system by using one or more non-cellular radios (e.g., 802.11) in the mobile computing device that can connect to the Internet. Yet in other embodiments, the operating system can establish a communication channel with the remote operating system by connecting to a Network Interface Card (NIC) in the dongle system that can connect to the Internet.

The mobile computing device can begin sending instructions between one or more peripheral devices connected to the dongle system and an operating system installed on a remote desktop client after the communication channel between the operating system and virtual desktop application has been established and the communication channel between the virtual desktop application and the one or more virtual filters has been established.

In step 718, the mobile computing device can begin sending signals to peripheral devices connected to the dongle system that are received from an operating system hosted on a remote desktop client. For example, an operating system hosted on a remote desktop client can send one or more signals to a mobile computing device instructing the virtual desktop application to play a sound through one or more speakers, and/or to display an image (still or moving) on a display connected to the dongle system. The virtual desktop application can send the received signals to the one or more virtual filters, which in turn can forward the signals to the corresponding peripheral devices connected to the dongle system.

In step 720, the mobile computing device can begin sending signals to an operating system hosted on a remote desktop client (remote operating system) corresponding to signals received from one or more peripheral devices connected to the dongle system. For example, the one or more virtual filters can receive interrupts from an interrupt handler corresponding to a keyboard and a pointing device, translate the interrupts into instructions that can be interpreted by the remote operating system, and forward the instructions to the virtual desktop application. The virtual desktop application can forward the instructions to the remote operating system using a communication channel established in step 716. The remote operating system can then execute the keyboard and pointing device instructions.

After the mobile computing device begins exchanging signals between an operating system hosted on a remote desktop client and one or more peripheral devices connected to the dongle system the method can proceed to end (726).

Returning to step 706, if the mobile computing device receives a response to use the one or more peripheral devices locally, the method can progress to step 722, and the mobile computing device can enable communication between the one or more peripheral devices and one or more device drivers (e.g., device driver 509A) installed on the mobile computing device. A communication channel between the one or more peripheral devices connected to a dongle system (e.g., dongle system 104) and the device drivers can take place via one or more interrupt handlers (e.g., interrupt handlers 511A) and hardware devices (e.g., hardware 513A) in the mobile computing device.

After communication between the one or more peripheral devices and the one or more device drivers has been established, the mobile computing device can begin exchanging signals between the operating system (e.g., operating system 507A) installed on the mobile computing device and the peripheral devices connected to the dongle system (724). For example, the operating system can receive a signal from a pointing device connected to the dongle system instructing the operating system to open one or more applications installed on the mobile computing device. The operating system can respond by opening the application and sending a signal to a display connected to the dongle system, requesting that the display display the contents of the application to a user. After the operating system and peripheral devices begin exchanging signals, the method can proceed to end (726).

FIG. 8 is a flowchart representing exemplary methods for filtering signals exchanged between a dongle system and a remote desktop client. It will be readily appreciated that the illustrated procedure can be altered to delete steps and/or further include additional steps. While the following description is directed to the method being performed by a mobile computing device (e.g., mobile computing device 101), it is appreciated that the method can be performed in whole or in part by a device other than the mobile computing device (e.g., dongle system 104). The exemplary methods described herein for filtering signals exchanged between a dongle system and a remote desktop client can enable a user to interact with (i.e., use) one or more remote computers (virtual and/or real) by logging into a remote desktop client that controls the one or more remote computers.

After initial start step, one or more virtual filters (e.g., virtual filter 515A) installed on a dongle system (e.g., dongle system 104) can receive one or more signals from an operating system hosted on a remote desktop client (remote operating system) through a mobile computing device connected to one or more digital networks (e.g., Internet), and can receive one or more signals from one or more peripheral devices connected to the dongle system (802). For example, the one or more virtual filters can receive one or more signals from an operating system hosted on a remote desktop client, instructing a display, stereo receiver, VoIP phone connected to a dongle system paired with the mobile computing device to perform one or more functions (e.g., display an image on the displays, adjust the volume on the stereo receiver, activate a ringer on the VoIP phone). For instance, the one or more virtual filters can receive one or more video and voice signals from a remote desktop client, and can instruct a microcontroller (e.g., controller 407) to send these signals to one or more host controllers (e.g., device controllers 411 and 415) that can in turn send the one or more video signals to an external display (not shown) connected to a first port (e.g., port 311B), and to send the one or more voice signals to a Voice over Internet Protocol (VoIP) phone connected to a second port (e.g., port 303B). In some embodiments, the one or more virtual filters can receive a signal, from a remote desktop client comprising one or more signals that are to be delivered to one or more peripheral devices via the dongle system. In other embodiments, the one or more virtual filters can receive the one or more signals individually, from one or more peripheral devices connected to the dongle system. In the former scenario the signal can be a composition of several signals generated by a remote desktop client that correspond to one or more peripheral devices. For example, the signal can comprise signals corresponding to a printer, a pointing device (e.g., 603A), an external display, one or more speakers or speaker receivers, a camera, etc. connected to the dongle system, and the one or more virtual filters can associate each signal with a corresponding peripheral device and forward the signals to a host controller associated with the peripheral device. The host controller can then forward the signal to the peripheral device instructing the peripheral device to perform an action in response to the signal. In some embodiments the one or more virtual filters (e.g., controller 317B) can receive one or more signals corresponding to one or more peripheral devices connected to a dongle system (e.g., dongle system 104) from one or more host controllers (e.g., device controller 411) instructing a remote desktop client to execute one or more instruction sets. For example, the one or more virtual filters can receive one or more signals from peripheral devices (e.g., keyboard 601 and/or pointing device 603) connected to the dongle system instructing the operating system hosted on the remote desktop client to perform one or more functions. For instance, the one or more virtual filters can receive one or more signals corresponding to signals generated by a pointing device, keyboard, and/or scanner instructing the operating system to scan a document into a directory located on the operating system as determined by the signals generated by the pointing device and the keyboard. In some embodiments, the one or more virtual filters can receive a single signal comprising the one or more signals generated by the pointing device, keyboard, and/or scanner. The one or more virtual filters can separate the one or more signals into signals corresponding to the individual peripheral devices (e.g., pointing device 603, keyboard 601, and/or scanner), and send these signals to the operating system hosted on the remote desktop client for execution. In other embodiments, the one or more virtual filters can receive one or more signals corresponding to individual peripheral devices. For instance, the one or more virtual filters can receive individual signals from the dongle system corresponding to a pointing device, a signal corresponding to a keyboard, and/or signal corresponding to a scanner. The one or more virtual filters can aggregate the individual signals into a signal that can be disaggregated by the remote desktop client as explained below. The remote desktop client can disaggregate the signal into the two signals generated by the corresponding peripheral devices, and execute the instructions associated with those signals.

The one or more virtual filters can receive signals from the operating system hosted on the remote desktop client through a virtual desktop application running on the mobile computing device. The one or more virtual filters can be implemented in software, firmware, hardware, or any combination thereof.

After the one or more virtual filters begin receiving signals from the remote operating system, and signals from one or more peripheral devices connected to the dongle system, the one or more virtual filters can determine if one or more of the peripheral devices will be used over a serial communication channel (804). If one or more of the peripheral devices will be used over a serial communication channel (serial signal), the mobile computing device can launch a virtual desktop infrastructure protocol endpoint (806). In some embodiments, the serial communication channel can be a RS-232 communication channel, a PS/2 communication channel for pointing devices and keyboards, and/or an Apple Desktop Bus communication channel. The virtual desktop infrastructure protocol endpoint can be a communication protocol that can be used to send the one or more signals received over the serial communication channel to the remote operating system. In some embodiments, the virtual desktop infrastructure protocol endpoint can be a general USB remoting protocol (e.g., Citrix Generic USB remoting protocol or VMware Horizon with View).

A communication session can be established between the virtual desktop infrastructure endpoint and an operating system installed on the mobile computing device in step 808 while the virtual desktop infrastructure protocol endpoint is being launched in step 806. In some embodiments, the communication session can be established after the virtual desktop infrastructure protocol endpoint is launched. In some embodiments the virtual desktop infrastructure protocol endpoint can establish the communication session with the operating system using one or more processes. For instance, if the virtual desktop infrastructure protocol endpoint needs to send instructions to one or more peripheral devices, the virtual desktop infrastructure protocol endpoint can send the instructions to the operating system, using one or more processes. The operating system can interpret the received signals and send the instructions to the peripheral devices. When the virtual desktop infrastructure protocol endpoint sends instructions to the operating system, the communication session can be established. In other embodiments, the virtual desktop infrastructure protocol endpoint can establish a communication session with the operating system using one or more threads. Yet in other embodiments one or more communication sessions can be established between the virtual desktop infrastructure endpoint and the operating system, thereby enabling the virtual desktop infrastructure application to use multithreading techniques.

A communication session can be established between the virtual desktop infrastructure protocol endpoint and one or more virtual filters in step 810 while the communication session is being established between the virtual desktop infrastructure protocol endpoint and the operating system in step 808. In some embodiments, the communication session between the virtual desktop infrastructure protocol endpoint and one or more virtual filters can be established after the communication session between the virtual desktop infrastructure protocol endpoint and the operating system is established. The communication session can be established between the virtual desktop infrastructure protocol endpoint and the one or more virtual filters the same way that the communication session can be established between the virtual desktop infrastructure protocol endpoint and the operating system running on the mobile computing device. In some embodiments, the communication session can be initiated by the one or more virtual filters. For instance, one or more of the virtual filters can intercept one or more keyboard and/or pointing device event messages, and send the messages to the virtual desktop infrastructure protocol endpoint, which can in turn send the messages to the operating system.

The virtual desktop infrastructure protocol endpoint can establish one or more communication channels with an operating system running on a remote desktop client (remote operating system) in step 812, while the communication session between the virtual desktop infrastructure protocol endpoint and the one or more virtual filters is being established in step 810. In some embodiments, the establishment of one or more communication channels with an operating system running on a remote desktop client can occur after the communication session between the virtual desktop infrastructure protocol endpoint and the one or more virtual filters has been established. The one or more communication channels between the virtual desktop infrastructure protocol endpoint and the remote operating system can be established by the operating system running on the mobile computing device. The operating system running on the mobile computing device can have one or more preexisting communication channels established between the mobile computing device and the remote operating system. The virtual desktop infrastructure protocol endpoint can use one or more of the communication channels to exchange information with the remote operating system. In some embodiments, the one or more communication channels can be one or more public Internet links connecting the operating system running on the mobile computing device and the remote operating system. For instance, the operating system can establish a communication channel with the remote operating system by using one or more cellular radios in the mobile computing device that can connect to the Internet. In some embodiments, the operating system can establish a communication channel with the remote operating system by using one or more cellular or non-cellular radios (e.g., 802.11) in the mobile computing device and/or one or more Network Interface Cards (NICs) or non-cellular radios in the dongle system that can connect to the Internet. In step 814, the mobile computing device can begin sending signals to peripheral devices connected to the dongle system that are received from an operating system hosted on a remote desktop client. For example, an operating system hosted on a remote desktop client can send one or more signals to the mobile computing device instructing the virtual desktop infrastructure protocol endpoint to play a sound through one or more speakers, and/or to display an image (still or moving) on a display connected to the dongle system. The virtual desktop infrastructure protocol endpoint can send the received signals to the one or more virtual filters, which in turn can forward the signals to the corresponding peripheral devices connected to the dongle system.

In step 816, the mobile computing device can begin sending signals received over a serial communication channel from one or more peripheral devices connected to the dongle system to an operating system hosted on a remote desktop client (remote operating system). For example, the one or more virtual filters can receive one or more interrupts from an interrupt handler on the dongle system corresponding to a keyboard and a pointing device, translate the interrupts into instructions that can be interpreted by the remote operating system, and forward the instructions to the virtual desktop infrastructure protocol endpoint. The virtual desktop infrastructure protocol endpoint can forward the instructions to the remote operating system using one or more of the communication channels established in step 816. The remote operating system can then execute the keyboard and pointing device instructions.

After the mobile computing device begins exchanging signals between the remote operating system and one or more peripheral devices connected to the dongle system, the method can proceed to end (834).

Returning to step 804, if the mobile computing device determines that the one or more peripheral devices will not be used over a serial communication channel, the method can progress to step 818, and the mobile computing device can launch a virtual desktop agent application. The virtual desktop agent application can enable one or more peripheral devices to interact with one or more applications, hosted on a remote desktop client. For example, when the virtual desktop agent application enables one or more peripheral devices to interact with one or more applications hosted on a remote desktop client, access can be restricted to the applications. In some embodiments, the virtual desktop agent application can enable one or more peripheral devices to interact with an operating system and the applications installed on the operating system hosted on a remote desktop client (i.e., remote desktop). For example, when the virtual desktop agent application enables one or more peripheral devices to interact with a remote desktop, access can be granted to the entire operating system and the applications installed on the operating system.

After the virtual desktop agent application has been launched, in step 818, a communication session can be established between the virtual desktop agent application and an operating system installed on the mobile computing device (820). In some embodiments, step 818 and step 820 can occur concurrently. In other embodiments, the virtual desktop agent application can establish the communication session with the operating system using one or more processes. For instance, if the virtual desktop agent application needs to send instructions to one or more peripheral devices, the virtual desktop agent application can send the instructions to the operating system, using one or more processes, which can in turn send the instructions to the peripheral devices. When the virtual desktop agent application sends instructions to the operating system the communication session can be established. In other embodiments the virtual desktop agent application can establish a communication session with the operating system using one or more threads. Yet in other embodiments, one or more communication sessions can be established between the virtual desktop agent application and operating system, thereby enabling the virtual desktop agent application to use multithreading techniques.

A communication session can be established between the virtual desktop agent application and one or more virtual filters in step 822 concurrently with, before, or after the establishment of the communication session between the virtual desktop agent application and the operating system in step 820. In some embodiments, the communication session can be established between the virtual desktop agent application and one or more virtual filters after the establishment of the communication session between the virtual desktop agent application and the operating system. The communication session can be established between the virtual desktop agent application and the one or more virtual filters the same way that the communication session can be established between the virtual desktop agent application and the operating system running on the mobile computing device. In some embodiments, the communication session can be initiated by the one or more virtual filters. For instance, one or more of the virtual filters can intercept one or more keyboard and/or pointing device event messages, and send the messages to the virtual desktop agent application, which can in turn send the messages to the operating system.

The virtual desktop agent application can establish one or more communication channels with an operating system running on a remote desktop client (remote operating system) in step 824 concurrently with the establishment of the communication session between the virtual desktop agent application and the one or more virtual filters in step 822. In some embodiments, the virtual desktop agent application can establish one or more communication channels with an operating system running on a remote desktop client, after the establishment of the communication session between the virtual desktop agent application and the one or more virtual filters. The one or more communication channels between the virtual desktop agent application and the remote operating system can be established by the operating system running on the mobile computing device. The operating system running on the mobile computing device can have one or more preexisting communication channels established between the mobile computing device and the remote operating system. The virtual desktop agent application can use one or more of the communication channels to exchange information with the remote operating system. In some embodiments, the one or more communication channels can be one or more public Internet links connecting the operating system running on the mobile computing device and the remote operating system. For instance, the operating system can establish a communication channel with the remote operating system by using one or more cellular radios and/or non-cellular radios (e.g., 802.11) in the mobile computing device that can connect to the Internet, and/or one or more non-cellular radios or Network Interface Cards (NICs) in the dongle system that can connect to the Internet.

After one or more communication channels have been established between the virtual desktop agent application and remote operating system, one or more virtual filters can determine if the signals being received are from one or more peripheral devices (826). In some embodiments this step can be performed by the virtual device agent application. If the one or more virtual filters determine that the signals are being received from the one or more peripheral devices, the virtual filters can multiplex the signals received from the one or more peripheral devices (828). For example, the one or more virtual filters can receive one or more signals corresponding to a pointing device, keyboard, camera, and/or fax machine and the one or more virtual filters can multiplex the signals into a single signal. The one or more virtual filters can multiplex the one or more signals using Time Division Multiplexing, Frequency Division Multiplexing, Space Division Multiplexing, Phase Division Multiplexing, Orbital Angular Multiplexing, and/or Code Division Multiplexing techniques.

After the one or more virtual filters have multiplexed the one more peripheral device signals, the one or more virtual filters can send the multiplexed signal to the virtual desktop agent application (830). The virtual desktop agent application can then encode the multiplexed signal, and the mobile computing device can send the encoded multiplexed signal to the remote operating system (832). The mobile computing device can send the encoded multiplexed signal to the remote operating system using one or more of the communication channels established in step 824. After the mobile computing device begins sending signals to the remote operating system the method can proceed to end (834).

Returning to step 826, if the one or more virtual filters determine that the signals are not being received from the one or more peripheral devices, the method can progress to step 836, and one or more of the virtual filters can demultiplex one or more signals received from the remote operating system via the virtual desktop agent application. For example, the one or more virtual filters can receive one or more signals instructing one or more peripheral devices connected to the dongle system to perform one or more actions. For instance, the one or more virtual filters can receive one or more signals corresponding to a display, stereo receiver, and/or scanner, and the one or more virtual filters can demultiplex the one or more signals using Time Division Demultiplexing, Frequency Division Demultiplexing, Space Division Demultiplexing, Phase Division Demultiplexing, Orbital Angular Demultiplexing, and/or Code Division Demultiplexing techniques.

After the one or more virtual filters demultiplex the one or more received signals, the one or more virtual filters can associate each signal with a corresponding peripheral device (838). The one or more virtual filters can then send each demultiplexed signal to the corresponding peripheral device (840). After the one or more virtual filters begin sending signals to the one or more peripheral devices the method can proceed to end (834).

The methods disclosed herein can be implemented as a computer program product comprising computer-readable instructions. Computer-readable instructions can be stored on a tangible non-transitory computer-readable medium, such as a flexible disk, a hard disk, a CD-ROM (compact disk-read only memory), an MO (magneto-optical) disk, a DVD-ROM (digital versatile disk-read only memory), a DVD RAM (digital versatile disk-random access memory), or a semiconductor memory. Alternatively, the methods can be implemented in hardware components or combinations of hardware and software of a data processing apparatus, e.g., a programmable processor, a computer, or multiple computers. The computer program can be written in any form of programming language, including compiled or interpreted languages, and it can be deployed in any form, including as a standalone program or as a module, component, subroutine, or other unit suitable for use in a computing environment. A computer program can be deployed to be executed on one computer or on multiple computers at one site or distributed across multiple sites and interconnected by a communication network.

In the preceding specification, the embodiments have been described with reference to specific exemplary embodiments. It will however, be evident that various modifications and changes can be made without departing from the broader spirit and scope of the exemplary embodiments as set forth in the claims that follow. The specification and drawings are accordingly to be regarded as illustrative rather than restrictive sense. Other embodiments of the present disclosure may be apparent to those skilled in the art from consideration of the specification and practice of the invention disclosed herein.

What is claimed is:

1. A method comprising:
   (a) connecting a device to a dongle system, the dongle system providing connectivity to one or more peripheral devices;
   (b) receiving, by the device, a signal from the dongle system of a peripheral device connected to the dongle system;
   (c) selecting by one of the device or the dongle, an operating system available via the device for which with the peripheral device will be used
   (d) establishing, by the device, a communication channel between the device and the dongle system; and
   (e) translating, by a virtual filter of the device, one or more interrupts corresponding to one or more signals received from the peripheral device via the dongle system into instructions formatted for the operating system.

2. The method of claim 1, wherein the operating system is hosted on a server in communication with the device.

3. The method of claim 1, wherein the operating system is accessed via a virtual desktop application executing via the local operating system on the device.

4. The method of claim 1, wherein (c) further comprises selecting the operating system comprising a local operating system of the device.

5. The method of claim 4, wherein (d) further comprises establishing the communication channel between the local operating system and the dongle.

6. The method of claim 1, wherein (c) further comprises selecting the operating system comprising a remote operating system accessible via the device.

7. The method of claim 6, wherein (d) further comprises establishing the communication channel between the local operating system and the dongle and a second communication channel between the local operating system and the remote operating system.

8. The method of claim 1, wherein (e) further comprises receiving, by the virtual filter, the one or more interrupts from one or more device controllers associated with the peripheral device connected via the dongle system.

9. The method of claim 1, further comprising receiving, by the virtual filter, one of signals or interrupts from the operating system and translate the signals or interrupts for the interrupt handlers of the dongle system, wherein the dongle system provides one or more corresponding signals to the peripheral device.

10. The method of claim 1, further comprising forwarding, by the virtual filter, the instructions to the operating system.

11. A system comprising:
    a dongle system providing connectivity to one or more peripheral devices;
    a device configured to connect to dongle system and receive a signal from the dongle system of a peripheral device connected to the dongle system;
    wherein one of the device or the dongle system is configured to select an operating system available via the device for which with the peripheral device will be used;

wherein the device is configured to establish a communication channel between the device and the dongle system; and a virtual filter of the device is configured to translate one or more interrupts corresponding to one or more signals received from the peripheral device via the dongle system into instructions formatted for the operating system.

12. The system of claim 11, wherein the operating system is hosted on a server in communication with the device.

13. The system of claim 11, wherein the operating system is accessed via a virtual desktop application executing via the local operating system on the device.

14. The system of claim 11, wherein the operating system comprises a local operating system of the device.

15. The system of claim 14, wherein the communication channel is configured to established between the local operating system and the dongle.

16. The system of claim 11, wherein the operating system comprises a remote operating system accessible via the device.

17. The system of claim 16, wherein the device is further configured to establish the communication channel between the local operating system and the dongle and a second communication channel between the local operating system and the remote operating system.

18. The system of claim 11, wherein the device is further configured to receive the one or more interrupts from one or more device controllers associated with the peripheral device connected via the dongle system.

19. The system of claim 11, wherein the virtual filter is further configured to receive one of signals or interrupts from the operating system and translate the signals or interrupts for the interrupt handlers of the dongle system, wherein the dongle system provides one or more corresponding signals to the peripheral device.

20. The system of claim 11, wherein the virtual filter is further configured to forward the instructions to the operating system.

* * * * *